(12) United States Patent
Takase et al.

(10) Patent No.: US 7,675,859 B2
(45) Date of Patent: Mar. 9, 2010

(54) TRANSMISSION APPARATUS AND TRANSMISSION SYSTEM

(75) Inventors: Masayuki Takase, Kokubunji (JP); Hideki Endo, Kokubunji (JP); Takayuki Kanno, Yokohama (JP); Nobuyuki Yamamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 361 days.

(21) Appl. No.: 11/841,277

(22) Filed: Aug. 20, 2007

(65) Prior Publication Data

US 2008/0056250 A1   Mar. 6, 2008

(30) Foreign Application Priority Data

Aug. 30, 2006 (JP) ............... 2006-233630

(51) Int. Cl.
    *G08C 15/00*   (2006.01)
(52) U.S. Cl. .............. 370/236.2; 370/392; 370/397; 370/407; 370/419
(58) Field of Classification Search ............ 370/370, 370/235, 236.2, 241, 1, 389, 395.1, 396–399, 370/395.3, 395.31, 409, 419
    See application file for complete search history.

(56) References Cited

U.S. PATENT DOCUMENTS 6,778,498 B2 * 8/2004 McDysan ............... 370/231
6,816,489 B1 * 11/2004 Patra et al. ............. 370/390
2007/0071011 A1 * 3/2007 de Heer et al. ......... 370/395.53

OTHER PUBLICATIONS

Series Y: Global Information Infrastructure and Internet Protocol Aspects, Internet protocol aspects—Operation, administration and maintenance, Y.1710 (Nov. 2002), ITU-T, Requirements for Operation & Maintenance functionality for MPLS networks.
Series Y: Global Information Infrastructure and Internet Protocol Aspects, Internet protocol aspects—Operation, administration and maintenance, Y.1720 (Apr. 2003), ITU, Protection switching for MPLS networks.
IEEE Std 802.3-2005, pp. 285-350.

* cited by examiner

*Primary Examiner*—Jayanti K Patel
*Assistant Examiner*—Bo Hui A Zhu
(74) *Attorney, Agent, or Firm*—Mattingly & Malur, P.C.

(57) ABSTRACT

A link aggregation function and maintenance function by MPLS OAM. Identical entry information is stored in plural circuits IF which perform a LA setting. In this way, multiplexing to the same LSP is possible even with different IF. The first network IF is assumed to be OAM ACT, and the second network IF is set to OAM SBY (SBY). OAM frame insertion is performed only by an OAM ACT port. In this way, in an opposite MPLS transmission apparatus, it is possible to prevent CV frame reception above a specified number of frames. Further, a switch forwarding table is set to forward frames from the network side to the first network IF of OAM ACT. The second network IF which was set to OAM SBY does not perform fault detection by CV reception. In this way, incorrect detection of faults due to non-reception of OAM can be prevented.

12 Claims, 25 Drawing Sheets

MPLS NETWORK FRAME

310

FORWARDING TABLE OF
MPLS TRANSMISSION APPARATUS

| LSP ID | OUTPUT PORT |
|--------|-------------|
| 100 | PHYSICAL PORT 100 |
| 1000 | PHYSICAL PORT 200 |
| 500 | PHYSICAL PORT 1 |
| 5000 | PHYSICAL PORT 1 |
| ⋮ | ⋮ |

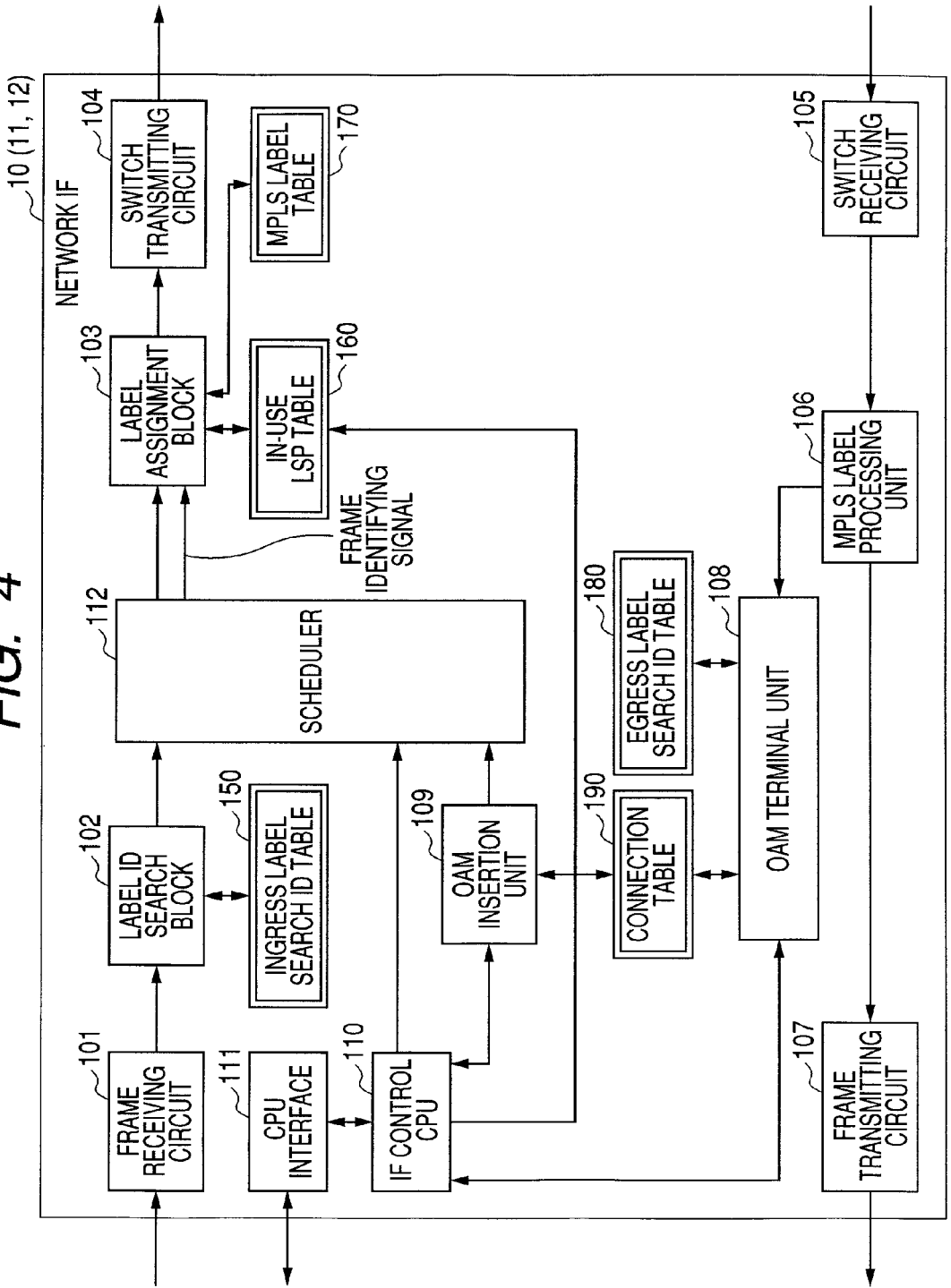

DEVICE FRAME FORMAT

FIG. 6A

150
INGRESS LABEL SEARCH ID TABLE

| VLAN ID | LABEL SEARCH ID |
|---|---|
| 10 | 1 |
| 20 | 2 |
| 30 | 3 |
| 40 | 4 |
| ... | ... |

TABLE SEARCH KEY: VLAN ID

FIG. 6B

160
IN-USE LSP TABLE

| LABEL SEARCH ID | IN-USE SIDE (NOTE) |
|---|---|
| 1 | 0 |
| 2 | 0 |
| 3 | 0 |
| 4 | 0 |
| ... | ... |

TABLE SEARCH KEY: LABEL SEARCH ID

NOTE:
0: WORKING, 1: PROTECTION

FIG. 6C

170
MPLS LABEL TABLE

| IN-USE SIDE (NOTE) | LABEL SEARCH ID | MPLS LABEL ID |
|---|---|---|
| 0 | 1 | 100 |
| 0 | 2 | 200 |
| ... | ... | ... |
| 1 | 1 | 1000 |
| 1 | 2 | 2000 |
| ... | ... | ... |

TABLE SEARCH KEY: IN-USE SIDE, LABEL SEARCH ID

NOTE:
0: WORKING, 1: PROTECTION

FIG. 7A

180
CONNECTION TABLE

| VALID | IN-USE SIDE (NOTE) | LABEL SEARCH ID | CONNECTIVITY VERIFICATION INFORMATION |
|---|---|---|---|
| 1 | 0 | 1 | 3 |
| 1 | 0 | 2 | 3 |
| ... | ... | ... | ... |
| 1 | 1 | 1 | 3 |
| 1 | 1 | 2 | 3 |
| ... | ... | ... | ... |

TABLE SEARCH KEY: { IN-USE SIDE (NOTE), LABEL SEARCH ID }

NOTE:
0: WORKING, 1: PROTECTION

FIG. 7B

190
EGRESS LABEL SEARCH ID TABLE

| MPLS LABEL ID | IN-USE SIDE (NOTE) | LABEL SEARCH ID |
|---|---|---|
| 500 | 0 | 1 |
| 5000 | 1 | 1 |
| 400 | 0 | 2 |
| 4000 | 1 | 2 |
| ... | ... | ... |

TABLE SEARCH KEY: { MPLS LABEL ID, IN-USE SIDE (NOTE) }

NOTE:
0: WORKING, 1: PROTECTION

MPLS OAM FRAME FORMAT

FIG. 10A

160
IN-USE LSP TABLE AFTER PROTECTION SWITCHING OPERATION

| LABEL SEARCH ID | IN-USE SIDE (NOTE) |
|---|---|
| 1 | 1 |
| 2 | 1 |
| 3 | 1 |
| 4 | 1 |
| ... | ... |

NOTE:
0: WORKING, 1: PROTECTION

FIG. 10B

180
CONNECTION TABLE AFTER FAULT HAS OCCURRED

| VALID | IN-USE SIDE (NOTE) | LABEL SEARCH ID | CONNECTIVITY VERIFICATION INFORMATION |
|---|---|---|---|
| 1 | 0 | 1 | 0 |
| 1 | 0 | 2 | 0 |
| ... | ... | ... | ... |
| 1 | 1 | 1 | 3 |
| 1 | 1 | 2 | 3 |
| ... | ... | ... | ... |

NOTE:
0: WORKING, 1: PROTECTION

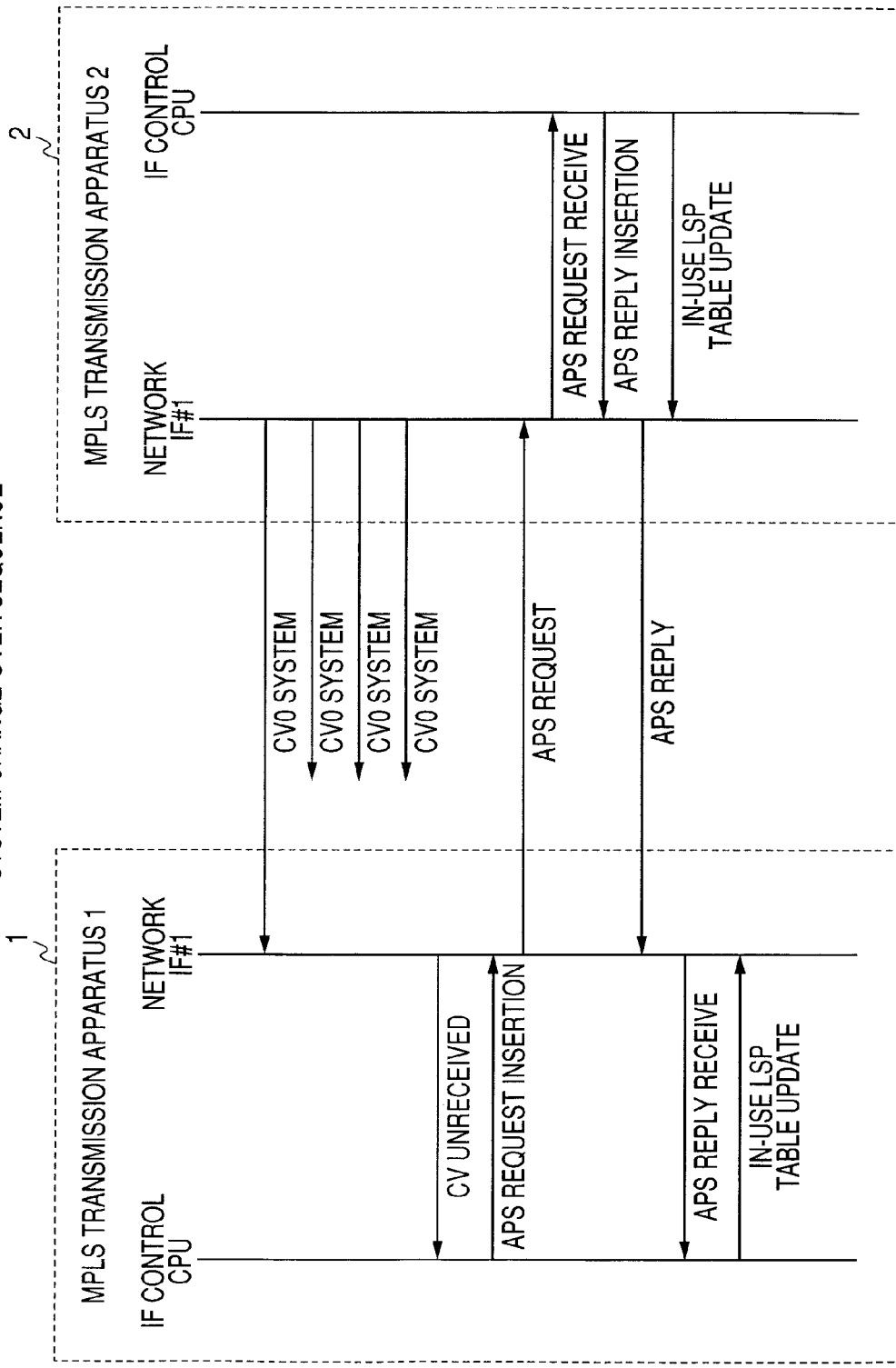

FIG. 16A

310
FORWARDING TABLE OF MPLS TRANSMISSION APPARATUS 1

| LSP | OUTPUT PORT |
|---|---|
| 100 | PHYSICAL PORT 100 |
| 1000 | PHYSICAL PORT 200 |
| 500 | PHYSICAL PORT 1 |
| 5000 | PHYSICAL PORT 1 |
| ... | ... |

CORRESPOND

FIG. 16B

50
LA INFORMATION

| PHYSICAL PORT | LA SETTING | LA PORT | ACT/SBY | FAULT INFORMATION |
|---|---|---|---|---|
| 1 | 1 | 1 | 1 | 0 |
| 2 | 1 | 1 | 0 | 0 |
| 3 | 0 | — | — | 0 |
| 4 | 0 | — | — | 0 |
| ... | ... | ... | ... | |

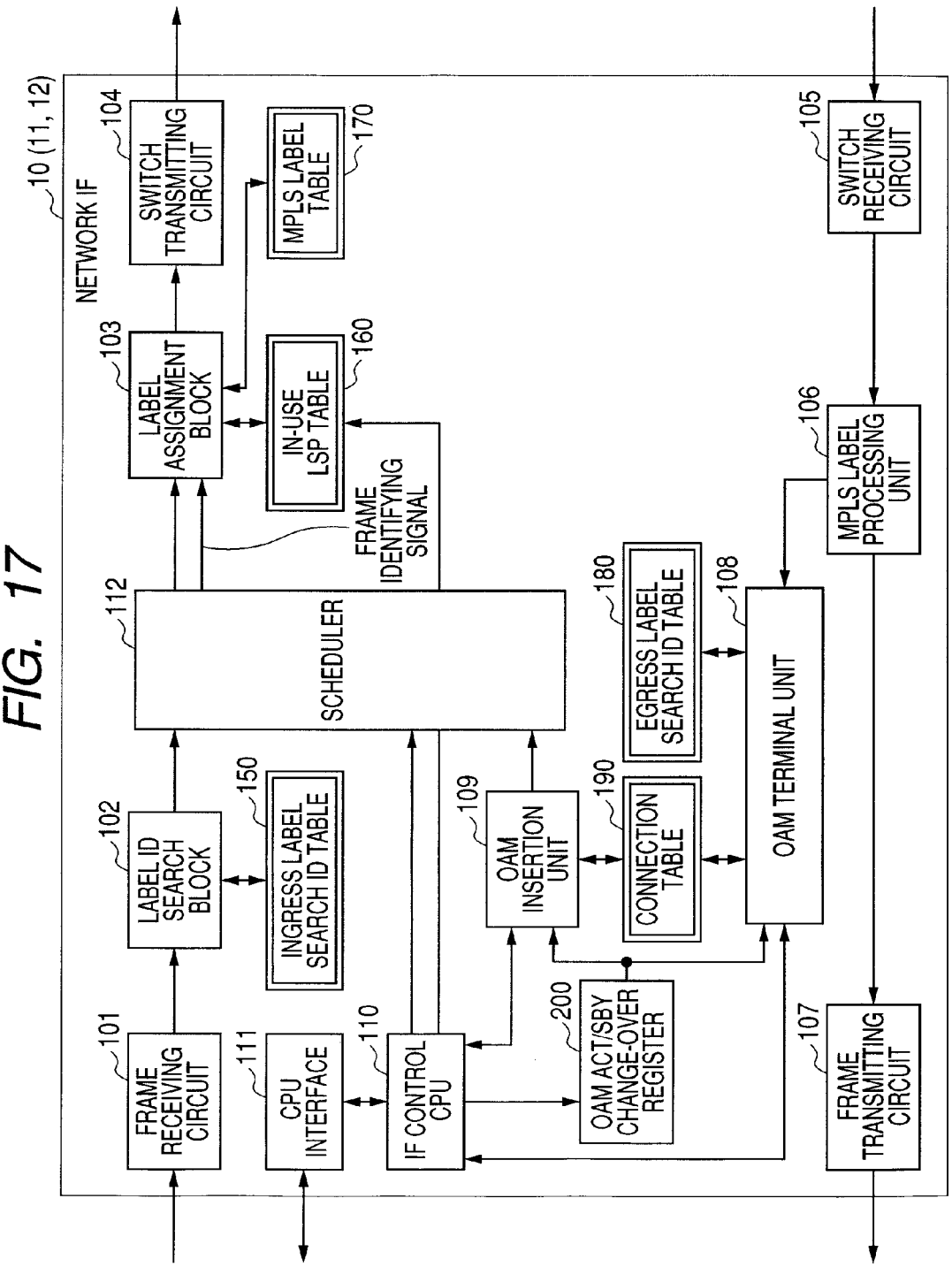

FIG. 19A

310
FORWARDING TABLE OF
MPLS TRANSMISSION APPARATUS 1

| LSP | OUTPUT PORT |
|---|---|
| 100 | PHYSICAL PORT 100 |
| 1000 | PHYSICAL PORT 200 |
| 500 | PHYSICAL PORT 2 |
| 5000 | PHYSICAL PORT 2 |
| ... | ... |

FIG. 19B

50
LA INFORMATION

| PHYSICAL PORT | LA SETTING | LA PORT | ACT/SBY | FAULT INFORMATION |
|---|---|---|---|---|
| 1 | 1 | 1 | 0 | 1 |
| 2 | 1 | 1 | 1 | 0 |
| 3 | 0 | – | – | 0 |
| 4 | 0 | – | – | 0 |
| ... | ... | ... | ... | |

CORRESPOND

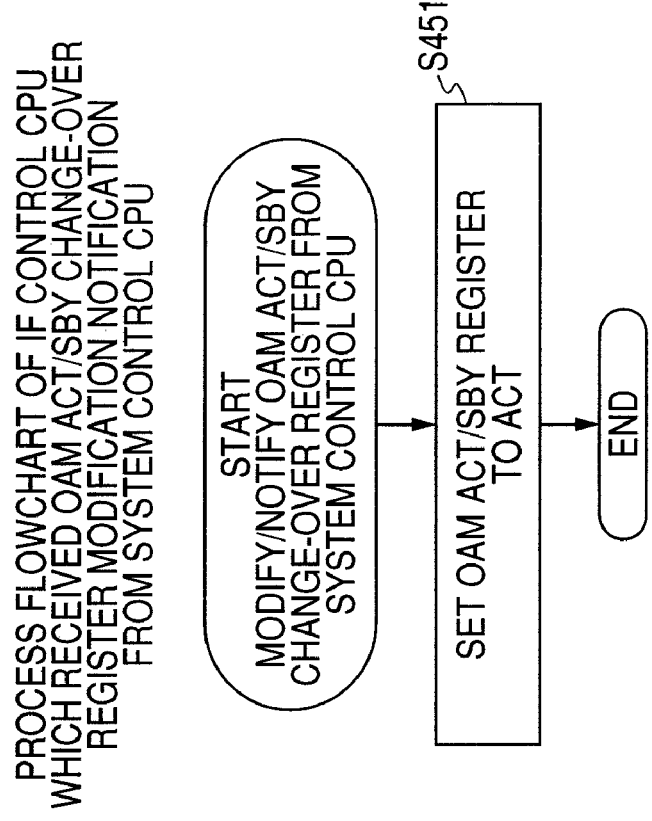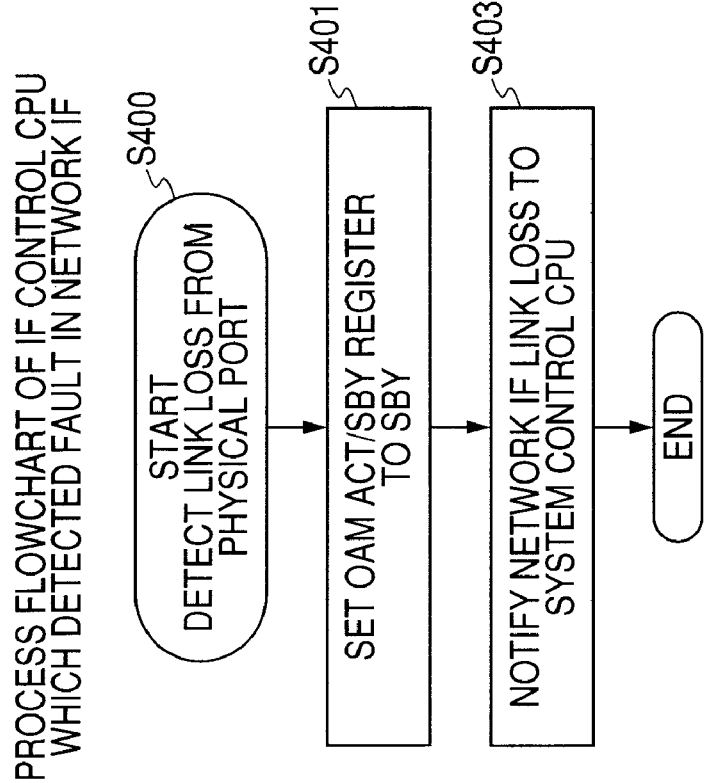

PROCESS FLOWCHART OF IF CONTROL CPU WHICH RECEIVED OPERATING SYSTEM CHANGE-OVER INFORMATION FROM SYSTEM CONTROL CPU

PROCESS FLOWCHART OF SYSTEM CONTROL CPU OF MPLS TRANSMISSION APPARATUS WHERE OPERATING SYSTEM CHANGE-OVER OCCURRED

FORWARDING TABLE OF
MPLS TRANSMISSION APPARATUS 1

| LSP | OUTPUT PORT | OAM ACT PORT |
|---|---|---|
| 100 | PHYSICAL PORT 100 | – |
| 1000 | PHYSICAL PORT 200 | – |
| 500 | LA PORT 1 | PHYSICAL PORT 1 |
| 5000 | LA PORT 1 | PHYSICAL PORT 1 |
| ⋮ | ⋮ | ⋮ |

TRANSMISSION APPARATUS AND TRANSMISSION SYSTEM

CLAIM OF PRIORITY

The present application claims priority from Japanese application JP 2006-233630 filed on Aug. 30, 2006, the content of which is hereby incorporated by reference into this application.

FIELD OF THE INVENTION

The invention relates to a transmission apparatus and transmission system, and more particularly relates to a transmission apparatus and transmission system which are provided with a link aggregation (LA) and MPLS OAM function.

BACKGROUND OF THE INVENTION

A device which provides a function called link aggregation (LA) is known. LA is a technique which bundles plural physical ports so that they are used as one logical port between two apparatuses. A device corresponding to LA selects an output physical port belonging to a LA port from identification information (ID) which specifies a flow, such as a VLAN (Virtual LAN) tag and MAC.

Some MPLS (Multi-Protocol Label Switching) transmission apparatuses determine a MPLS LSP (Label Switching Path) connection from, for example, a VLAN. An MPLS transmission apparatus provided with a maintenance function by MPLS OAM (Operations, Administration and Maintenance) monitors end-to-end connectivity by periodically forwarding a connectivity verification (CV) frame. When the CV frame is not received, each interface unit changes over the operating system from working to protection.

Nonpatent document 1: ITU-T Recommendation Y.1710 SERIES Y: GLOBAL INFORMATION INFRASTRUCTURE AND INTERNET PROTOCOL ASPECTS, Internet Protocol Aspects-Operation, Administration and Maintenance Nonpatent document 2: ITU-T Recommendation Y.1720 SERIES Y: GLOBAL INFORMATION INFRASTRUCTURE AND INTERNET PROTOCOL ASPECTS, Internet Protocol Aspects—Operation, Administration and Maintenance Protection switching for MPLS networks Nonparent document 3: IEEE Standard for information technology telecommunications and information exchange between systems—Local and metropolitan area networks—Specific requirements, Part 3: Carrier sense multiple access with collision detection (CSMA/CD) access method and physical layer specifications, Section 3, Chapter 43, pp. 285-350

SUMMARY OF THE INVENTION

In an apparatus which connects an MPLS network with an Ethernet (registered trademark, hereafter idem) network, path redundancy may be provided by both networks. Although the layers of the Ethernet network and MPLS network differ, the carrier side may stress reliability and use an MPLS network, whereas the user side may prefer the relatively economical Ethernet network. Since they are provided by different functions, in the prior art, it was difficult to consistently provide a redundant path.

Moreover, a system which connected a MPLS transmission apparatus having a MPLS OAM function to a device corresponding to a LA, was not known. If they are connected, the following points for example will be a problem.

LA collectively uses plural physical ports as one logical port. Even if a VLAN flow inputted into an MPLS transmission apparatus from a LA port differs as to the physical port (line interface unit), it must be forwarded through the same MPLS LSP connection. However, in a conventional MPLS transmission apparatus, in some cases, the flow inputted into different IF could not be forwarded through the same MPLS LSP connection.

When there are two OAM insertion points in a device A, at an OAM terminal point of an opposite device B, two CV frames will arrive in a predetermined time from the same MPLS connection. With an ordinary OAM termination point, since the normality of a connection is verified because one CV frame reaches in a predetermined time, incorrect recognition may thus occur.

Since a switch of apparatus A allocates frame forwarding destinations by a LSP ID (label), the traffic to device A is biased toward one of plural physical ports corresponding to the LA port from apparatus B. Therefore, in a physical port which cannot receive traffic, the CV frame cannot be received. A physical port which could not receive the CV frame may thus erroneously detect a fault.

It is therefore an object of the present invention, which aims to resolve the above problem, to provide a transmission apparatus and transmission system which achieve redundancy of Ethernet sections by link aggregation, and to provide redundancy of MPLS sections by a maintenance function by MPLS OAM. It is a further object of the invention to forward a frame received by plural interface units corresponding to link aggregation, to the same path. The invention aims to prevent erroneous fault detection of MPLS OAM. Another object of the invention is to prevent a user frame from being biased towards one of plural interface units corresponding to link aggregation.

The same entry information is stored for example in a table for assigning the labels of plural physical ports which are set as a LA. In this way, multiplexing to the same LSP is possible even between different IFs.

One of the plural physical ports is set to OAM ACT (ACT), and the other port is defined as OAM SBY (SBY). Only the OAM ACT port transmits the OAM frame. In this way, in the opposite MPLS transmission apparatus, reception of more than a specified number of CV frames can be prevented.

Only the port defined as OAM ACT receives the OAM frame. The other port is set to OAM SBY and fault detection by CV reception is not performed. For example, by setting the switch forwarding table so that the forwarding destination is the physical port set to OAM ACT for frames received from the MPLS network, OAM frames can be terminated at the OAM ACT port. In this way, erroneous fault detection due to non-reception of OAM can be prevented.

When an OAM ACT port is closed due to a fault in the Ethernet link, the OAM SBY port is changed to ACT. The forwarding destination of the switch is also changed to the OAM ACT port after change-over. When there are plural OAM SBY ports, a priority order may be assigned.

According to a first aspect of the invention, a transmission apparatus is connected to a first transmission apparatus in which plural physical ports are bundled together and used as one logical port, and when the output destination of a received frame is a link aggregation port which is this logical port, this frame is forwarded to any physical port of the link aggregation port, and the transmission apparatus is connected to a second transmission apparatus via a communications network which removes redundancy via a first path and second path, the purpose of the transmission apparatus being to forward a frame inputted from the first transmission apparatus to the second transmission apparatus by encapsulation with a label, and forwarding the frame inputted from the second transmission apparatus by decapsulation by removing the label, and the transmission apparatus includes:

a first interface unit for connecting to the first path;

a second interface unit for connecting to the second path;

a third interface unit for connecting to the first physical port of the first transmission apparatus forming the link aggregation port;

a fourth interface unit for connecting to the second physical port of the first transmission apparatus forming the link aggregation port; and a switch having a forwarding table wherein identifiers of the first to fourth interface units are stored as output destination information corresponding to the label of the first path and second path, which forwards the frame according to the corresponding output destination information by looking up the forwarding table based on the label of the frame to which a label was assigned, and the third interface unit has a first storage unit wherein fault detection ACT or SBY is set, and the first storage unit is set to ACT;

the fourth interface unit has a second storage unit wherein fault detection ACT or SBY is set, and the second storage unit is set to SBY;

the third interface unit receives a user frame sent from the first physical port of the first transmission apparatus, and forwards the user frame to the second transmission apparatus by encapsulating the user frame with the label of the first path via the first path by the switch;

the fourth interface unit receives a user frame sent from the second physical port of the first transmission apparatus, and forwards the user frame to the second transmission apparatus by encapsulating the user frame with the label of the first path via the first path by the switch;

the third interface unit sends a connectivity verification frame to the second transmission apparatus according to the first storage unit which was set to ACT;

the fourth interface unit does not send a connectivity verification frame to the second transmission apparatus according to the second storage unit which was set to SBY;

the forwarding table stores at least an identifier of the third interface unit set to ACT as output destination information corresponding to the label in the downstream direction received by the first and second interface units via the first and second paths, and the switch forwards a connectivity verification frame received from the second transmission apparatus by the first path and second path, to the third interface unit according to the forwarding table;

the third interface unit receives the connectivity verification frame sent at a predetermined interval by the second transmission apparatus, and detects a fault in the first or second paths by detecting that the connectivity verification frame was not received according to the first storage unit set to ACT; and the fourth interface unit does not detect a fault by detecting that the connectivity verification frame was not received according to the second storage unit which was set to SBY.

According to a second aspect of the invention, a transmission apparatus is connected to a first transmission apparatus wherein plural physical ports are bundled together and used as one logical port, and when the output destination of a received frame is a link aggregation port which is this logical port, this frame is forwarded to any physical port of the link aggregation port, and the transmission apparatus is connected to a second transmission apparatus via a communications network which removes redundancy via a first path and second path, the purpose of the transmission apparatus being to forward a frame input from the first transmission apparatus to the second transmission apparatus by encapsulation with a label, and forward the frame inputted from the second transmission apparatus by decapsulation by removing the label, and the transmission apparatus includes:

a first interface unit for connecting to the first path;

a second interface unit for connecting to the second path;

a third interface unit for connecting to the first physical port of the first transmission apparatus forming the link aggregation port;

a fourth interface unit for connecting to the second physical port of the first transmission apparatus forming the link aggregation port; and a switch having a forwarding table wherein identifiers of the first to fourth interface units are stored as output destination information corresponding to the label of the first path and second path, which forwards the frame according to the corresponding output destination information by looking up the forwarding table based on the label of the frame to which a label was assigned; and the third interface unit has a first storage unit wherein fault detection ACT or SBY is set, and the first storage unit is set to ACT;

the fourth interface unit has a second storage unit wherein fault detection ACT or SBY is set, and the second storage unit is set to SBY;

the third interface unit receives a user frame sent from the first physical port of the first transmission apparatus, and forwards the user frame to the second transmission apparatus by encapsulating the user frame with the label of the first path via the first path by the switch;

the fourth interface unit receives a user frame sent from the second physical port of the first transmission apparatus, and forwards the user frame to the second transmission apparatus by encapsulating the user frame with the label of the first path via the first path by the switch;

the third interface unit sends a connectivity verification frame to the second transmission apparatus according to the first storage unit which was set to ACT;

the fourth interface unit does not send a connectivity verification frame to the second transmission apparatus according to the second storage unit which was set to SBY;

the forwarding table stores at least an identifier showing link aggregation as first output destination information for the user frame corresponding to the label in the downstream direction received by the first and second interface units via the first and second paths, and an identifier of the third interface unit set to ACT as second output destination information for the connectivity verification frame;

the switch identifies whether the frame received by the second transmission apparatus is a user frame or connectivity verification frame; and when the frame is a user frame, the switch selects one of the interface units belonging to the link aggregation showing the first output destination information of the forwarding table based on predetermined rules, and forwards the frame to the first transmission apparatus via the selected interface unit;

when the frame is a connectivity verification frame, the switch forwards the frame to the third interface unit according to the second output destination information of the forwarding table;

the third interface unit receives the connectivity verification frame sent at a predetermined interval by the second transmission apparatus, and detects a fault in the first or second paths if the connectivity verification frame was not received according to the first storage unit set to ACT; and the fourth interface unit does not detect a fault if the connectivity verification frame was not received according to the second storage unit set to SBY.

According to a third aspect of the invention, a transmission system includes:

a first transmission apparatus wherein plural physical ports are bundled together as one logical port, and when the output destination of a received frame is a link aggregation port which is this logical port, this frame is forwarded to any physical port of the link aggregation port, a second transmission apparatus via a communications network which removes redundancy via a first path and second path, and a third transmission apparatus connected to the first and second transmission apparatus, forwarding a frame input from the first transmission apparatus to the second transmission apparatus by encapsulation with a label, and forwarding the frame inputted from the second transmission apparatus by decapsulation by removing the label, and the third transmission apparatus includes:

a first interface unit for connecting to the first path;

a second interface unit for connecting to the second path;

a third interface unit for connecting to the first physical port of the first transmission apparatus forming the link aggregation port;

a fourth interface unit for connecting to the second physical port of the first transmission apparatus forming the link aggregation port; and a switch having a forwarding table wherein identifiers of the first to fourth interface units are stored as output destination information corresponding to the label of the first path and second path, which forwards the frame according to the corresponding output destination information by looking up the forwarding table based on the label of the frame to which a label was assigned; and the third interface unit has a first storage unit wherein fault detection ACT or SBY is set, and the first storage unit is set to ACT;

the fourth interface unit has a second storage unit wherein fault detection ACT or SBY is set, and the second storage unit is set to SBY;

the third interface unit receives a user frame sent from the first physical port of the first transmission apparatus, and forwards the user frame to the second transmission apparatus by encapsulating the user frame with the label of the first path via the first path by the switch;

the fourth interface unit receives a user frame sent from the second physical port of the first transmission apparatus, and forwards the user frame to the second transmission apparatus by encapsulating the user frame with the label of the first path via the first path by the switch;

the third interface unit sends a connectivity verification frame to the second transmission apparatus according to the first storage unit which was set to ACT;

the fourth interface unit does not send a connectivity verification frame to the second transmission apparatus according to the second storage unit which was set to SBY;

the forwarding table stores at least an identifier of the third interface unit set to ACT as output destination information corresponding to the label in the downstream direction received by the first and second interface units via the first and second paths, and the switch forwards a connectivity verification frame received from the second transmission apparatus by the first path and second path, to the third interface unit according to the forwarding table;

the third interface unit receives the connectivity verification frame sent at a predetermined interval by the second transmission apparatus, and detects a fault in the first or second paths by detecting that the connectivity verification frame was not received according to the first storage unit set to ACT; and the fourth interface unit does not detect a fault by detecting that the connectivity verification frame was not received according to the second storage unit which was set to SBY.

According to a fourth aspect of the invention, a transmission system includes:

a first transmission apparatus in which plural physical ports are bundled together as one logical port, and when the output destination of a received frame is a link aggregation port which is this logical port, this frame is forwarded to any physical port of the link aggregation port, a second transmission apparatus connected via a communications network which removes redundancy via a first path and second path, and a third transmission apparatus connected to the first and second transmission apparatuses, forwards a frame inputted from the first transmission apparatus to the second transmission apparatus by encapsulation with a label, and forwards the frame inputted from the second transmission apparatus by decapsulation by removing the label, and the third transmission apparatus includes:

a first interface unit for connecting to the first path;

a second interface unit for connecting to the second path;

a third interface unit for connecting to the first physical port of the first transmission apparatus forming the link aggregation port;

a fourth interface unit for connecting to the second physical port of the first transmission apparatus forming the link aggregation port; and a switch having a forwarding table wherein identifiers of the first to fourth interface units are stored as output destination information corresponding to the label of the first path and second path, which forwards the frame according to the corresponding output destination information by looking up the forwarding table based on the label of the frame to which a label was assigned; and the third interface unit has a first storage unit wherein fault detection ACT or SBY is set, and the first storage unit is set to ACT;

the fourth interface unit has a second storage unit wherein fault detection ACT or SBY is set, and the second storage unit is set to SBY;

the third interface unit receives a user frame sent from the first physical port of the first transmission apparatus, and forwards the user frame to the second transmission apparatus by encapsulating the user frame with the label of the first path via the first path by the switch;

the fourth interface unit receives a user frame sent from the second physical port of the first transmission apparatus, and forwards the user frame to the second transmission apparatus by encapsulating the user frame with the label of the first path via the first path by the switch;

the third interface unit sends a connectivity verification frame to the second transmission apparatus according to the first storage unit which was set to ACT;

the fourth interface unit does not send a connectivity verification frame to the second transmission apparatus according to the second storage unit which was set to SBY;

the forwarding table stores at least an identifier showing link aggregation as first output destination information for the user frame corresponding to the label in the downstream direction received by the first and second interface units via the first and second paths, and an identifier of the third interface unit set to ACT as second output destination information for the connectivity verification frame;

the switch identifies whether the frame received by the second transmission apparatus is a user frame or connectivity verification frame; and when the frame is a user frame, the switch selects one of the interface units belonging to the link aggregation showing the first output destination information of the forwarding table based on predetermined rules, and forwards the frame to the first transmission apparatus via the selected interface unit;

when the frame is a connectivity verification frame, the switch forwards the frame to the third interface unit according to the second output destination information of the forwarding table;

the third interface unit receives the connectivity verification frame sent at a predetermined interval by the second transmission apparatus, and detects a fault in the first or second paths if the connectivity verification frame was not received according to the first storage unit set to ACT; and the fourth interface unit does not detect a fault if the connectivity verification frame was not received according to the second storage unit set to SBY.

According to an embodiment of the invention, there are provided a transmission apparatus and transmission system which can provide redundancy of Ethernet sections by link aggregation, and redundancy of MPLS sections by MPLS OAM. According to an embodiment of the invention, a frame received with plural interface units corresponding to link aggregation can be forwarded to the same LSP. According to an embodiment of the invention, erroneous detection of faults in MPLS OAM can be prevented. Further, according to an embodiment of the invention, a bias of a user frame towards one of plural interface units corresponding to link aggregation can be prevented.

BRIEF DESCRIPTION OF THE DRAWINGS

FIG. 4 is a schematic diagram of a network IF of an MPLS transmission apparatus;

FIG. 6A shows a configuration example of an ingress label search ID table 150;

FIG. 6B shows a configuration example of an in-use LSP table;

FIG. 6C shows a configuration example of MPLS label table 170;

FIG. 7A shows a configuration example of a connection table 180;

FIG. 7B shows a configuration example of an egress label search ID table 190;

FIG. 10A and FIG. 10B are descriptive diagrams (2) of an in-use/SBY system change-over when a fault occurs in a working LSP (in-use LSP);

FIG. 11 is a system change-over sequence when CV is not received;

FIG. 16A is a configuration example of a forwarding table 310;

FIG. 16B is a configuration example of an LA information database;

FIG. 17 is a schematic diagram of a network IF 10;

FIG. 19A and FIG. 19B show a table configuration example after change-over due to fault occurrence in an Ethernet section;

FIG. 21A and FIG. 21B are flowcharts (2) of a change-over due to fault occurrence in an Ethernet section;

FIG. 25 is a schematic diagram of a forwarding table 320 in a second embodiment.

DETAILED DESCRIPTION OF THE PREFERRED EMBODIMENTS

First Embodiment (Link Aggregation)

Figure 1:
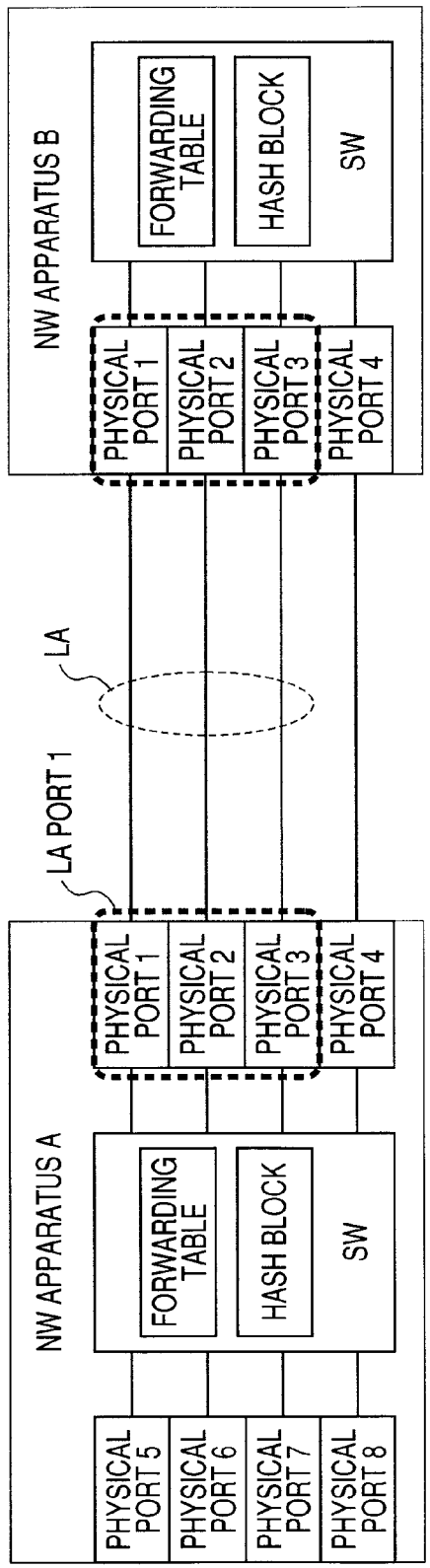
FIG. 1A is a descriptive diagram of a LA.
FIG. 1B shows a forwarding table of NW apparatus A.

FIG. 1 is a diagram of a LA. First, the LA will be described.

A L2 common switch (NW apparatus) corresponding to a tag VLAN sets the relation between the VLAN tag and an output port as a forwarding table. The L2 switch learns the transmitting origin MAC Address of an input frame, VLAN ID and input physical port, and when the learned MAC Address and the frame which has the VLAN ID as the destination are received, the L2 switch performs an output port search from a learning table, and switches the frame.

One of the functions of the L2 switch is known as link aggregation (LA) which bundles plural physical ports together as one logical port. Here, the logical port bundled by LA is referred to as a LA port. LA can for example logically increase the circuit bandwidth and enhance redundancy. In this embodiment, we shall focus for example on increasing redundancy. The LA port is a logical port formed from plural physical ports (e.g., the physical ports 1-3 in FIG. 1A), but the switch recognizes these as one port.

When a LA setup is performed, for example, a VLAN tag and its output port property are set in the forwarding table of the switch. When the destination of a received frame is addressed to the LA port, the switch forwards the frame to one of the physical ports of the LA port. If this is a physical port which is unit of the LA, there is no problem regarding the LA specification whichever port the frame is sent to. In general, when the transmission destination of a frame is a LA port, the switch determines the output port using Hash. At this time, a Hash block performs a Hash calculation, for example using the destination MAC Address and VLAN ID, and specifies the destination physical port of the frame. The calculation result of Hash is unique, and frames having the same VLAN ID and destination MAC are forwarded to the same physical port. It is possible to distribute frames between LA ports effectively by using Hash.

(MPLS)

Next, MPLS will be described in the context of this embodiment.

Figure 2:
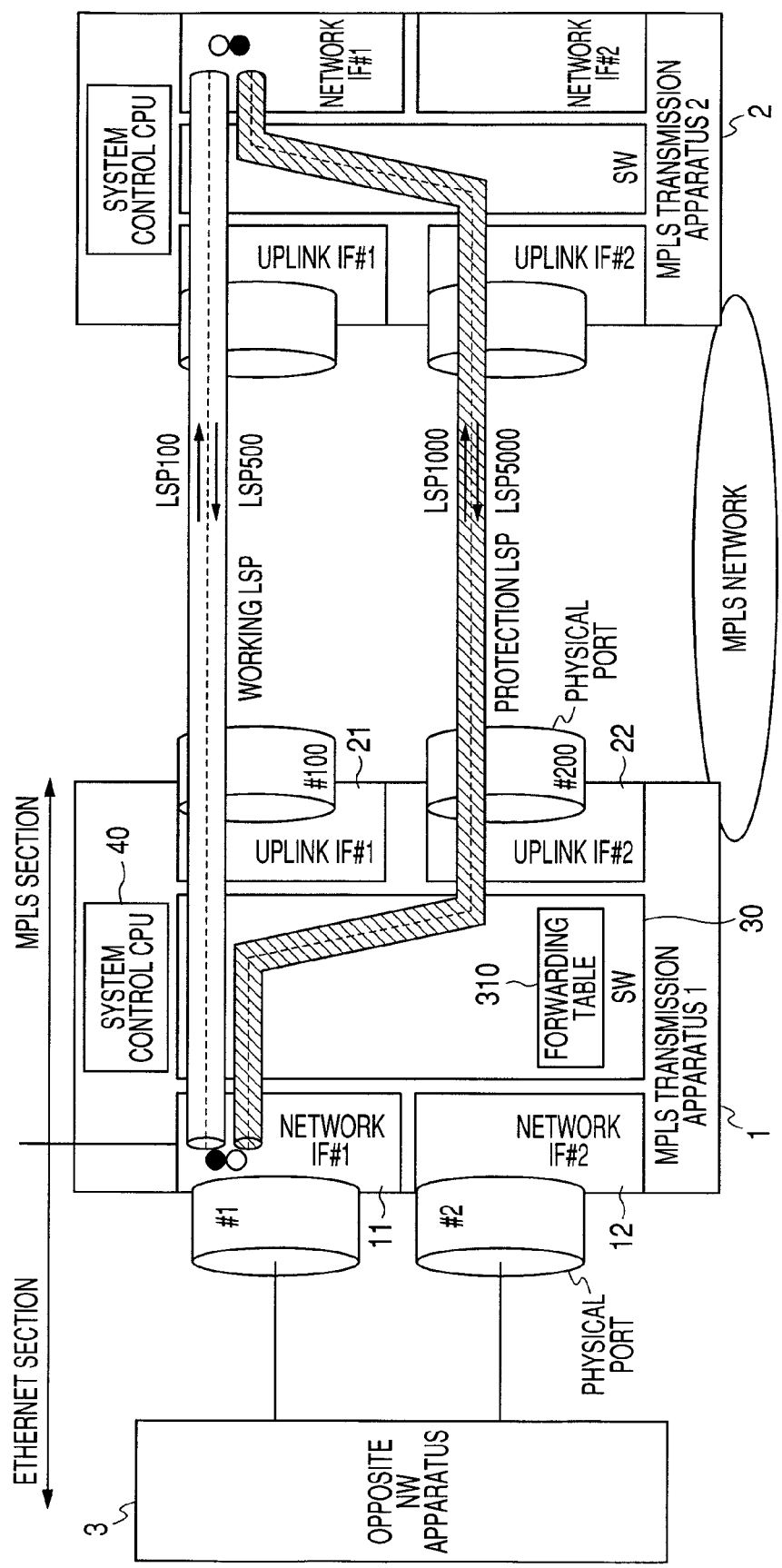
FIG. 2 is a diagram of an MPLS network connected to an MPLS transmission apparatus which supports MPLS OAM, and MPLS transmission apparatus.

FIG. 2 is a diagram of an MPLS network and an MPLS transmission apparatus to which an MPLS transmission apparatus which supports MPLS OAM is connected. FIG. 3 is a diagram of an MPLS network frame and a forwarding table.

MPLS is a protocol characterized by encapsulating and forwarding an inputted L2 frame or L3 frame with an MPLS label. For example, as shown in FIG. 3, an MPLS label and new L2 header are assigned and forwarded to the inputted original L2 frame. Here, although the description is for an MPLS which encapsulates an L2 frame, the operation of this function is the same for MPLS which encapsulates an L3 frame. Also, in an MPLS which encapsulates an L2 frame, the frame is generally encapsulated by two MPLS labels, but to simplify the description, the case will be described where one label is assigned. For this function, the operation is the same when plural labels are encapsulated. The MPLS transmission apparatus determines the forwarding destination of the frame using LSP ID in the MPLS label.

An MPLS transmission apparatus 1 for example includes a network IF#1 (third interface unit) 11, network IF#2 (fourth interface unit) 12, UplinkIF#1 (third interface unit) 21, UplinkIF#2 (second interface unit) 22, switch (SW) 30, and system control CPU (control unit) 40. The system control CPU 40 is connected with each unit by for example a bus or the like. It may also have a memory as required.

Figures 3A, 3B:
FIG. 3A is a diagram of an MPLS network frame.
FIG. 3B shows a forwarding table 310.

The switch 30 has a forwarding table 310. The forwarding table 310, for example as shown in FIG. 3B, stores output port information corresponding to the LSP ID.

The details of each unit will be described later.

FIG. 4 is a schematic diagram (1) of the network IF of the MPLS transmission apparatus. The circuits IF 11 and 12 can be considered to have identical constructions.

The network IF 10 has a frame receiving circuit 101, label ID search block 102, scheduler 112, label assignment block 103, switch transmitting circuit 104, switch receiving circuit 105, MPLS label processing unit 106, frame transmitting circuit 107, OAM termination unit 108, OAM insertion unit 109, IF control CPU 110, and CPU interface unit 111. The network IF 10 also has an Ingress label search ID table (first label search table) 150, in-use LSP table 160, MPLS label table 170, Egress label search ID table (second label search table) 180, and MPLS label table 190.

FIG. 6 and FIG. 7 are drawings showing configuration examples of each table.

The Ingress label search ID table 150 is a table which holds a label search ID for searching the in-use LSP table 160 and MPLS label table 170 corresponding to the VLAN ID. The search key of this table is the VLAN ID of the received frame. The acquired label search ID is held by a device header.

The in-use LSP table 160 is a table holding operating system information which shows the system currently in operation corresponding to the label search ID. The system currently in operation holds identification information, i.e., working or protection. The search key of this table is the label search ID.

The MPLS label table 170 is a table holding a MPLS label ID (LSP ID, label) for assignment when encapsulating a frame corresponding to the operating system information and label search ID. The search keys of this table are the operating system information and a label search ID.

An Egress label search ID table 180 is a table holding a label search ID for searching a MPLS label table 190 corresponding to the MPLS label ID and operating system information. The search key of this table is the MPLS label ID. In MPLS, a different label is used for upstream and downstream. Here, the label search ID for searching the upstream label and the label search ID acquired from the downstream label are identical.

The MPLS label table 190 is a table which holds connectivity verification information corresponding to operating system information and the label search ID. The search keys of this table are the operating system information and the label search ID. For connectivity verification information of this table, an initial value of, for example, "3" is written in the OAM termination unit 108 when a CV frame is received, and "1" is subtracted for example once every 1 second by the OAM insertion unit 109. When this value has reached "0", it means that a CV has not arrived for 3 seconds or more. When this value has reached a threshold (for example, 0), i.e., when a CV is not been received for 3 seconds or more, it is considered that a connection fault has been detected. The initial value, value to be subtracted and threshold value for fault detection may be suitable values. Alternatively, the initial value is incremented, and when it has reached a predetermined value, it may be considered that a connection fault has been detected.

Valid shows the validity/invalidity of an entry. For example, when Valid is 1, the entry is valid, and on the other hand when it is 0, the entry is invalid.

Figure 5:
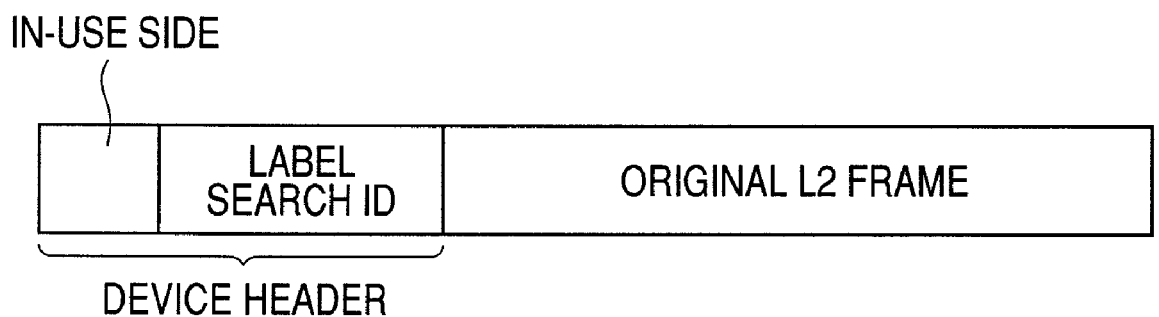
FIG. 5 is a frame format in a network IF.

FIG. 5 shows the frame format in the network IF. As for frames in the device, the device header is assigned to the original L2 frame. The device header contains for example the operating system information and the label search ID.

Figure 8:
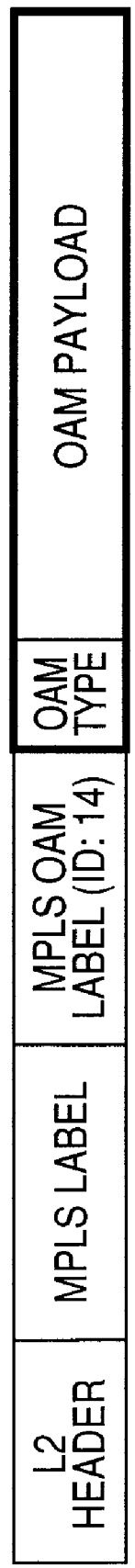
FIG. 8 is a MPLS OAM format.

FIG. 8 shows a MPLS OAM format.

The MPLS OAM frame has for example a L2 header, an MPLS label, MPLS OAM label, OAM type and OAM payload. The MPLS label contains the LSP ID. An ID which shows for example 14 in decimal notation is stored in the MPLS OAM label. The OAM type contains information corresponding to CV, APS (system change-over). The OAM payload contains information as to whether the APS is an APS Request or APS Acknowledge.

Returning to FIG. 4, each block will now be described.

In the frame receiving circuit 101, a L2 frame is received from a physical port (for example, physical port #1), and a device header is assigned to the original L2 frame (for example, FIG. 5). Here, the device header may also be empty. A label ID search block 102 extracts the VLAN ID from the L2 header of the received frame, searches the Ingress label search ID table 150, and acquires a corresponding label search ID.

The label ID search block 102 stores the acquired label search ID in the device header of the received frame, and outputs the frame to the scheduler 112. The scheduler 112 performs, for example, scheduling of frame transmission. The frame type outputs a frame identifying signal to the label assignment block 103 according to whether the frame is an OAM frame or a user frame. The processing performed by the label assignment block 103 is different for an OAM frame and a user frame. When the frame identifying signal from the scheduler 112 is "0", a user frame is meant. When a user frame is received, the label assignment block 103 extracts a label search ID from the device header of the received frame, and operating system data corresponding to the label search ID are acquired from the in-use LSP table 160.

The label assignment block 103 searches the MPLS label table 170 based on the operating system information and label search ID which were acquired, and acquires a corresponding MPLS label ID. The label assignment block 103 generates an MPLS label from the MPLS label ID acquired from the table, generates a L2 header from new L2 header information which was preset in a register, and encapsulates the original L2 frame.

On the other hand, when the frame identifying signal is "1", an OAM insertion frame (CV/APS) is meant. The label assignment block 103 searches the MPLS label table 170 by the operating system information and label search ID which were acquired from the device header without searching the in-use LSP table 160. The label assignment block 103 encapsulates the OAM frame with the new L2 header and MPLS label. The switch transmitting circuit 104 deletes the device header, and transmits the encapsulated frame to SW.

The switch receiving circuit 105 receives the frame from SW. The MPLS label processing unit 106 verifies the MPLS label in the frame received from the SW side, and forwards a frame with a MPLS OAM label to the OAM termination unit 108. For other frames, the new L2 header and MPLS label are deleted, and they are forwarded to the frame transmitting circuit 107. The frame transmitting circuit 107 transmits the frame to a physical port (for example, physical port #1). The OAM insertion unit 109 searches all entries in the MPLS label table 190, for example once a second.

The OAM insertion unit 109 generates a CV frame payload for registered entries or entries for which Valid is valid "1", assigns a device header containing the operating system information and label search ID acquired from the table, and outputs it (inserts it into) the scheduler 112. The format of the frame inserted from the OAM insertion unit 109 consists of the device header, MPLS OAM label and OAM payload (including the OAM Type). The value of the connectivity verification information of the searched entry is decreased for example by 1. When the value of the connectivity verification information is already "0", subtraction is not performed, and operating system information for an entry for which the value of the connectivity verification information is "0", the label search ID and information showing non-reception of CV, are notified to the IF control CPU 110.

The OAM insertion unit 109 also inserts an APS Request frame and an APS Acknowledge frame according to instructions.

The OAM termination unit 108 receives the frame which has a MPLS OAM label from the MPLS label processing unit 106. The OAM termination unit 108 performs respectively different operations when it receives an OAM frame CV, APS Request and APS Acknowledge. CV, APS Request and APS Acknowledge can be distinguished for example by the type value of OAM Type of the received frame, or information showing Request/Acknowledge in the OAM payload.

When a CV is received, the OAM termination unit 108 searches the Egress label search ID table 180 using the MPLS label ID as a search key, and acquires corresponding operating system information and a corresponding label search ID. The OAM termination unit 108 searches the MPLS label table 190 from the operating system information acquired from the Egress label search ID table 180 and label search ID, and sets corresponding connectivity verification information to, for example, "3."

When an APS Request is received, the OAM termination unit 108 searches the Egress label search ID table 180 using the MPLS label ID as a search key, and acquires corresponding operating system information and a corresponding label search ID. The OAM termination unit 108 notifies an APS Request Receive Notification including information which shows reception of the operating system information and label search ID which were acquired from the Egress label search ID table 180, and the APS Request, to the IF control CPU 110.

When an APS Acknowledge is received, the OAM termination unit 108 acquires the operating system information and label search ID from the Egress label search ID table 180 as in the case of APS Request Receive, and notifies an APS Acknowledge Receive, including information which shows reception of the operating system information and label search ID which were acquired, and the APS Acknowledge, to the IF control CPU 110.

The IF control CPU 110 performs entry setup of each table, and insertion system change-over processing of APS Request/Acknowledge frames.

A CPU interface unit 111 is an interface unit between the IF control CPU 110 and system control CPU 40.

In APS Request Insertion, the IF control CPU 110 inputs the label search ID and operating system of the connectivity verification information entry "0" from the OAM insertion unit 109. The IF control CPU 110 generates the payload and OAM label of the APS Request. A device header is also generated. Operating system information about the system which transmitted the acquired label search ID and APS Request is stored in the device header. Operating system information about the system which transmitted the APS Request can be set to the operating system notified from the OAM insertion unit 109, reverse system or a system other than the operating system. Hence, the APS Request is transmitted using a different system from the system in which a fault occurred.

In APS Acknowledge Insertion, the IF control CPU 110 inputs the aforesaid APS Request Acknowledge from the OAM termination unit 108. This notification contains operating system information and a label search ID. The IF control CPU 110 generates the payload and OAM label of APS Acknowledge. A device header is also generated. The label search ID and the operating system information which were acquired are stored in the device header. The IF control CPU 110 adds an OAM label and the device header to the payload, generates APS Acknowledge, and outputs it to the scheduler 112. APS Acknowledge is forwarded by the same operating system as for APS Request.

In system change-over processing, in the IF control CPU 110, the aforesaid APS Acknowledge Receive notice is input from the OAM termination unit 108. This notification includes the label search ID and operating system information. The IF control CPU 110 searches the in-use LSP table 160 with the acquired label search ID, and updates it to the operating system information acquired in the operating system information column of the table.

(Change-Over Between Operating System/SBY System when a Fault Occurs—1)

Figure 9:
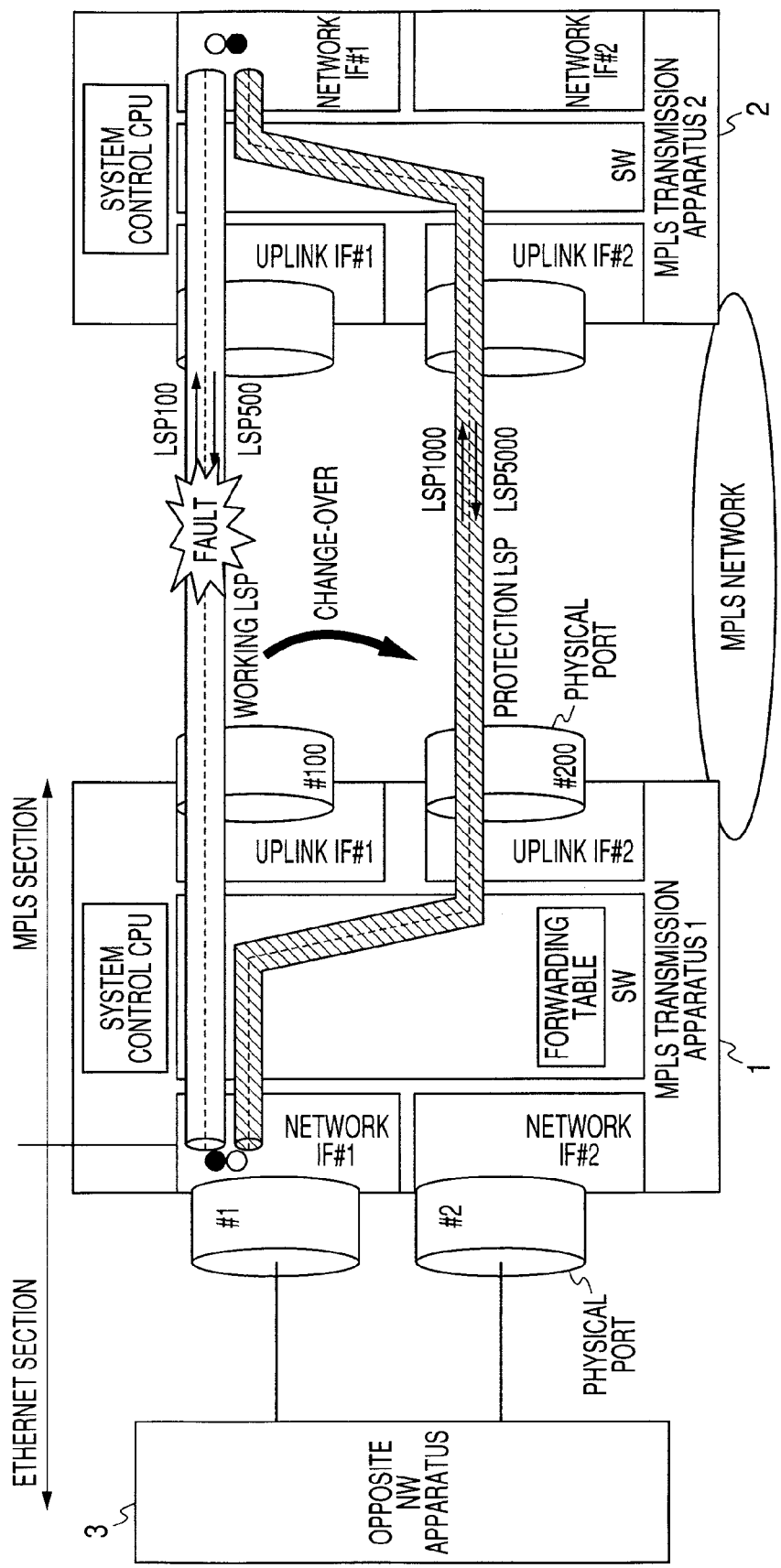
FIG. 9 is a descriptive diagram (1) of an in-use/SBY system change-over when a fault occurs in a working LSP (in-use LSP) (1)

FIGS. 9 and 10 are descriptive diagrams of an operating system/SBY system change over when a fault occurs in working LSP (operating system).

For example, when a fault occurs downstream of working LSP (operating system), a connectivity verification frame is not received by the network IF of the MPLS transmission apparatus 1. Hence, for example, the connectivity verification information of the MPLS label table 190 is 0 (for example, FIG. 10B). If a CV has not been received, the terminal node (e.g., the network IF#1 (11) of the MPLS transmission apparatus 1) detects that the fault has occurred in a midway path, and transmits a system change-over (APS) Request frame using a standby system connection (LSP 1000). The starting point node (for example, network IF# (11) of the MPLS transmission apparatus 2) which received the APS Request frame transmits an APS Acknowledge frame using the SBY system connection (LSP 5000). The terminal node which received the APS Acknowledge frame, in order to change-over the system from 0 to 1, updates the operating system information in the in-use LSP table 160 (FIG. 10A).

Hence, in the MPLS transmission apparatuses 1, 2 which provide change-over using MPLS OAM, system change-over is performed using "CV not received" as a trigger.

FIG. 11 is a diagram of system change-over due to non-reception of CV. The IF control CPU 110 in the drawing is contained in the network IF as described above, but for the sake of simplicity, it is divided into the IF control CPU 110 and other parts, the parts other than the IF control CPU 110 being marked collectively as a network IF.

The network IF#1 (11) of the MPLS transmission apparatus 2 transmits the CV frame for example periodically via the working path, as opposed to the network IF#1 (11) of the MPLS transmission apparatus 1. Here, as an example, it will be assumed that the first CV frame has reached the network IF#1 (11) of the MPLS transmission apparatus 1, but a fault occurs in the working path, and subsequent CV frames were not received by the network IF#1 (11) of the MPLS transmission apparatus 1.

When for example the connectivity verification frame information of the MPLS label table 190 is 0 due to not receiving CV frames for a predetermined time, the network IF#1 (11) of the MPLS transmission apparatus 1 (e.g., OAM terminal unit 108) notifies the IF control CPU 110 of the MPLS transmission apparatus 1 that a CV has not been received. The IF control CPU 110 of the MPLS transmission apparatus 1 instructs APS Request insertion to the network IF# (11) of the MPLS transmission apparatus 1 (for example, the OAM insertion unit 109). The network IF# (11) of the MPLS transmission apparatus 1 (for example, the OAM insertion unit 109) transmits an APS Request frame to the network IF# (11) of the MPLS transmission apparatus 2 via protection LSP.

The network IF# (11) of the MPLS transmission apparatus 2 (for example, the OAM terminal unit 108) receives the APS Request frame, and it notifies APS Request reception to the IF control CPU 110 of the MPLS transmission apparatus 2. The IF control CPU 110 of the MPLS transmission apparatus 2 instructs APS Acknowledge insertion to the network IF# (11) of the MPLS transmission apparatus 2 (for example, the OAM insertion unit 109). The network IF# (11) of the MPLS transmission apparatus 2 transmits an APS Acknowledge frame to the network IF# (11) of the MPLS transmission apparatus 1 (for example, the OAM insertion unit 109) via protection according to the instruction. The IF control CPU 110 of MPLS transmission apparatus 2 also updates the operating system information in the in-use LSP table 160 from working to protection.

The network IF# (11) of the MPLS transmission apparatus 1 (for example, OAM termination unit 108) receives an APS Acknowledge frame, and it notifies APS Acknowledge reception to the IF control CPU 110 of the MPLS transmission apparatus 1. The IF control CPU 110 of the MPLS transmission apparatus 1 updates the in-use LSP table 160 from working to protection.

Figure 12:
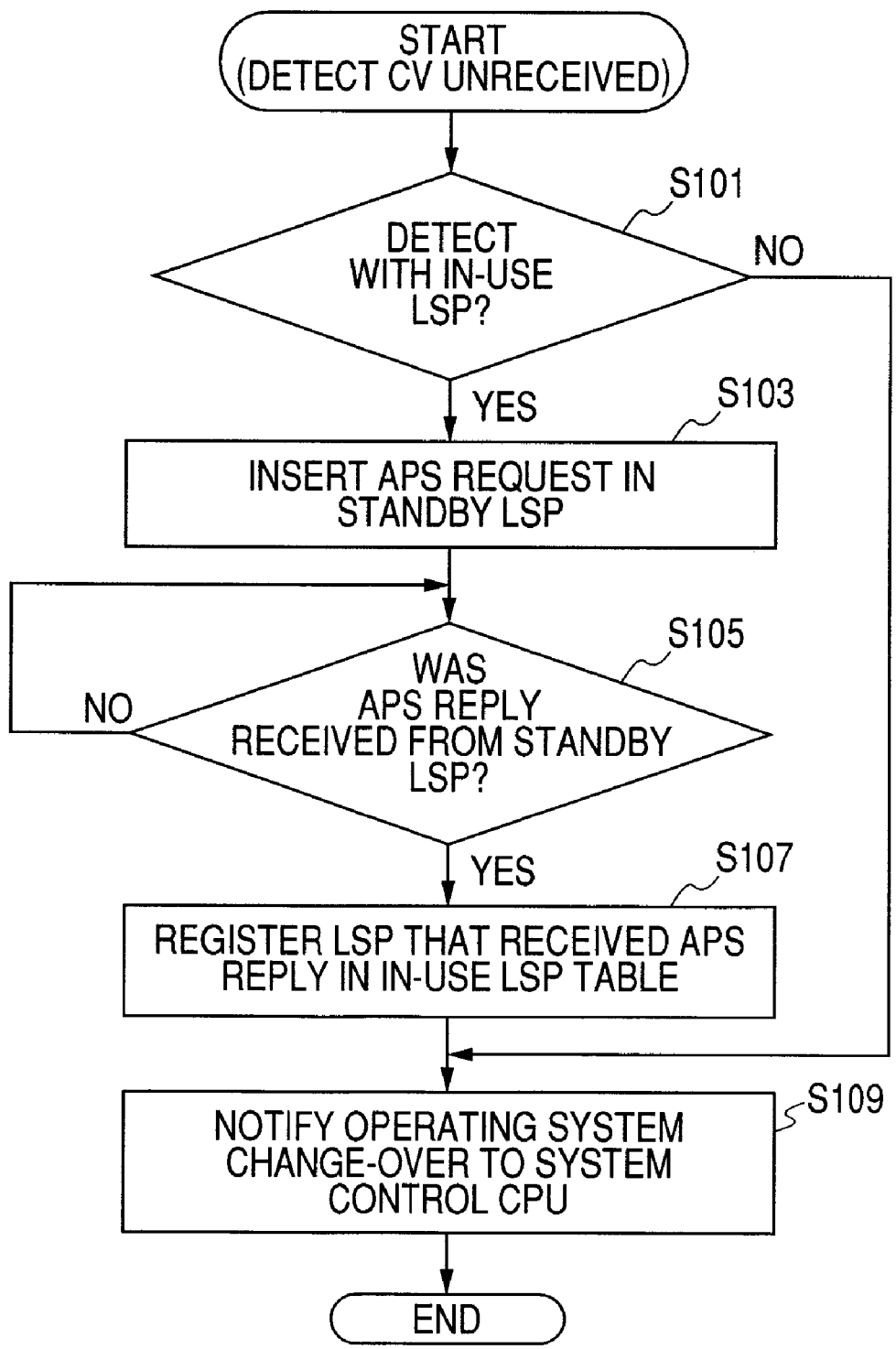
FIG. 12 is a flowchart of an IF control CPU 110 of a CV non-reception detection node.

FIG. 12 is a flowchart of the IF control CPU 110 of a CV non-reception detection node. For example, it is a flowchart of the IF control CPU 110 of the MPLS transmission apparatus 1 in FIG. 11.

The IF control CPU 110 determines whether CV non-reception was detected by the operating system (S101). For example, the IF control CPU 110 looks up the in-use LSP table 160 based on the label search ID contained in the notification from the OAM insertion unit 109, and acquires working or protection. If the acquired operating system and the operating system information contained in the notice from the OAM insertion unit 109 match, it is determined that this is the operating system, and if they do not match, it is determined that this is not the operating system. If it is determined that it is not the operating system (S101, No), the routine proceeds to a Step S109.

On the other hand, if it is determined that it is the operating system, the IF control CPU 110 instructs insertion of an APS Request frame to the SBY system (S103). The IF control CPU 110 monitors whether an APS Acknowledge frame is received from the SBY system (S105). For example, the monitoring of reception of the APS Acknowledge frame is continued until a timeout occurs (S105, No).

If the IF control CPU 110 receives an APS Acknowledge frame by the OAM termination unit 108 (S105, Yes), it changes the operating system information in the in-use LSP table 160 corresponding to the LSP which received APS Acknowledge (S107). For example, the operating system information is updated from working to protection. For example, if an APS Acknowledge frame is received by LSP 5000, a label search ID and the operating system which received APS Acknowledge are notified to the IF control CPU 110 from the OAM termination unit 108. The OAM termination unit 108 may acquire the label search ID and operating system information by looking up the Egress label search ID table 180 based on the MPLS label ID. The IF control CPU 110 searches the in-use LSP table 160 with the label search ID, and changes the "operating system" of the corresponding entry to the system which received APS Acknowledge. The table change locations when the APS Acknowledge is received, can be set for example to only one location in the table. More specifically, the operating system (for example, protection) which received APS) and the label search ID (for example, 1) are first notified to the IF control CPU 110 from the OAM termination unit 108. Next, the IF control CPU 110 changes the operating system of the search ID "1" of the in-use LSP table 160 shown in FIG. 6B, from "0" to "1".

The IF control CPU 110 notifies the operating system change to the system control CPU 40 (S109). For example, this includes the system information after the change-over (for example, protection).

Figure 13:
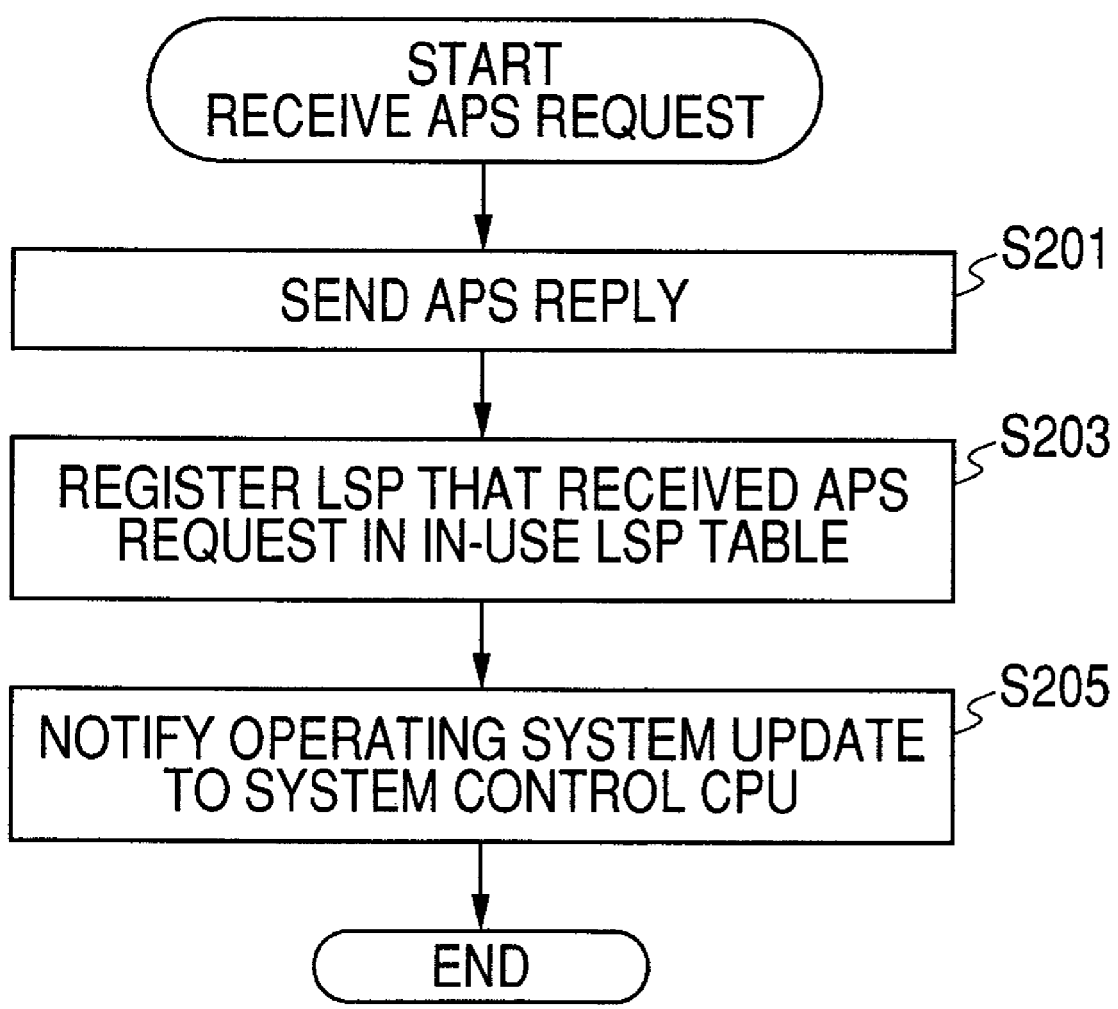
FIG. 13 is a flowchart of an IF control CPU 110 of an APS Request receiving node.

FIG. 13 is a flowchart of the IF control CPU 110 of the APS Request receiving node. For example, it is a flowchart of the IF control CPU 110 of the MPLS transmission apparatus 2 in FIG. 11.

The IF control CPU 110, when an APS Request is received, inserts an APS Acknowledge frame in the opposite LSP to the LSP which received the APS Request frame (S201). For example, in FIG. 9, when an APS Request frame is received from the LSP 1000, an APS Acknowledge frame is inserted in the LSP 5000.

The IF control CPU 110 changes the operating system information in the in-use LSP table 160 corresponding to the LSP which received the APS Request (S203). The operation and change location when the APS Request is received are identical to when the APS Acknowledge was received. Although the table shown in FIGS. 6 and 10 are examples of tables of the MPLS transmission apparatus 1, the MPLS transmission apparatus 2 may have an identical table construction. For example, the in-use LSP table is searched from the label search ID which received the APS Request, and the "operating system" of the corresponding entry is changed to the operating system which received the APS. This is identical when the MPLS transmission apparatus 1 receives an APS Request from the MPLS transmission apparatus 2. The IF control CPU 110 notifies the operating system change to the system control CPU 40 (S205). For example, this includes the system information after the change-over (for example, protection).

(LA and MPLS OAM)

Figure 14:
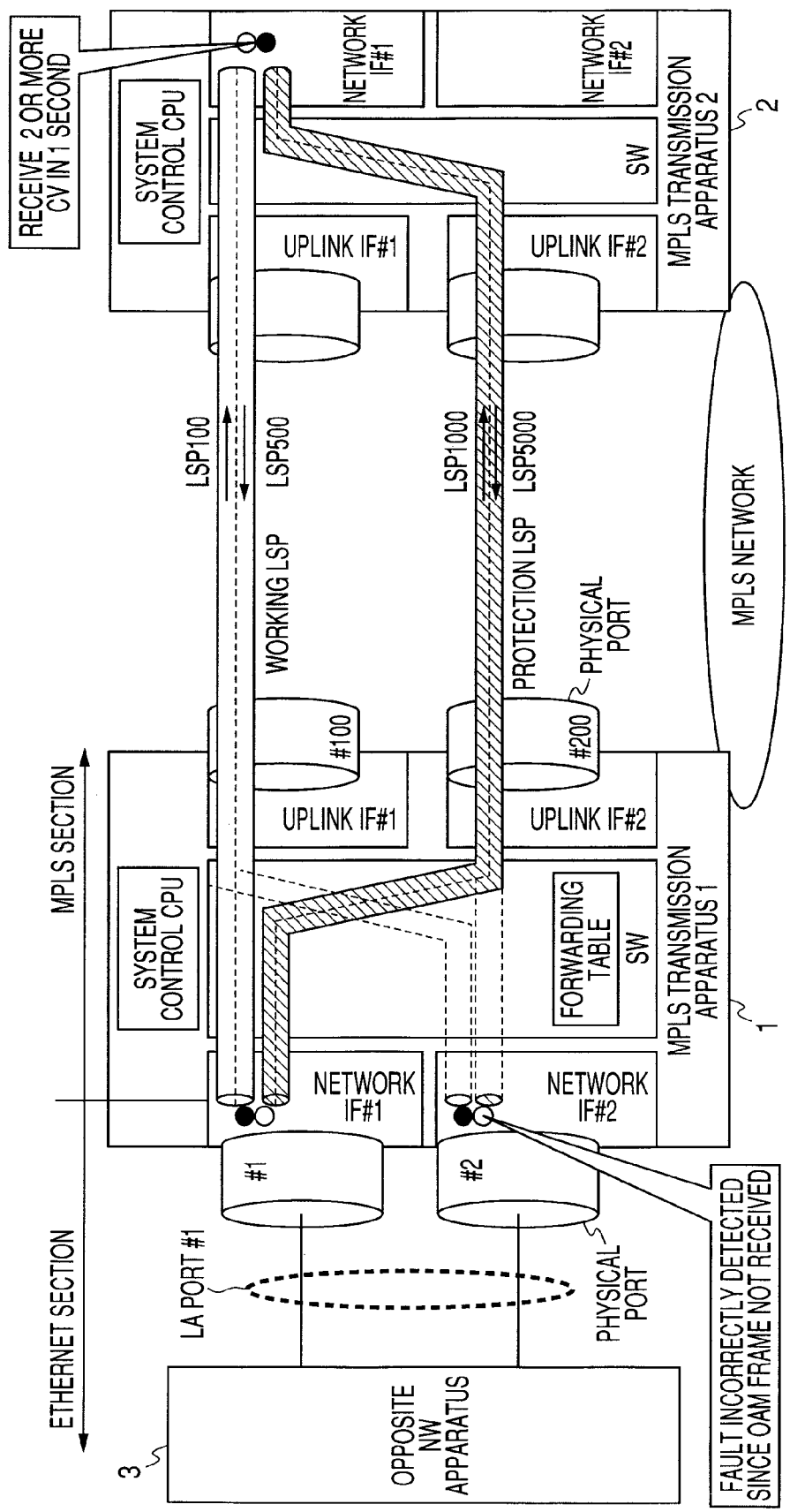
FIG. 14 is a descriptive diagram of a problem in a transmission apparatus provided with a LA and a MPLS OAM function.

FIG. 14 is a diagram of the assignment in a transmission apparatus provided with a LA and a MPLS OAM function.

LA is a technique which operates plural physical ports as one logical port. Therefore, even if a VLAN flow belonging to the same MPLS connection is input from another physical port, it is necessary to forward it with the same MPLS label path and the same path. However, since the conventional MPLS transmission apparatus held header processing tables individually by network IF, there was a case where the VLAN frame could not be transmitted through the same upstream connection. For downstream frames, since the switch 30 changed the path by the LSP ID, a frame could be forwarded to only one of the network IF. Here, upstream means the direction of an MPLS section from an Ethernet section, and downstream means the direction of an Ethernet section from an MPLS section.

Namely, in a conventional MPLS transmission apparatus, the following problems for example occur.

First, there was the case where an upstream frame could not be forwarded by the same LSP. There was also the case where a downstream frame could be forwarded only partially. Since the OAM frame can be forwarded only to one physical port, in the OAM termination unit 108 of other physical ports, some OAM may not have arrived and a fault may have been erroneously detected.

Since, if it is attempted to forward a frame by the same LSP from plural physical ports, the CV frame from each network IF is also transmitted by the same LSP, in the opposite MPLS transmission apparatus, for example, two or more CV frames may be received in 1 second from the same LSP, i.e., more than a specified number of frames are received, so there is a possibility of erroneous recognition. Further, since a bias to the downstream user frame forwarding destination network IF occurs, it may be that bandwidth expansion, which is one of the advantages of using LA, cannot be provided.

(System which Connects Link Aggregation to MPLS)

Figure 15:
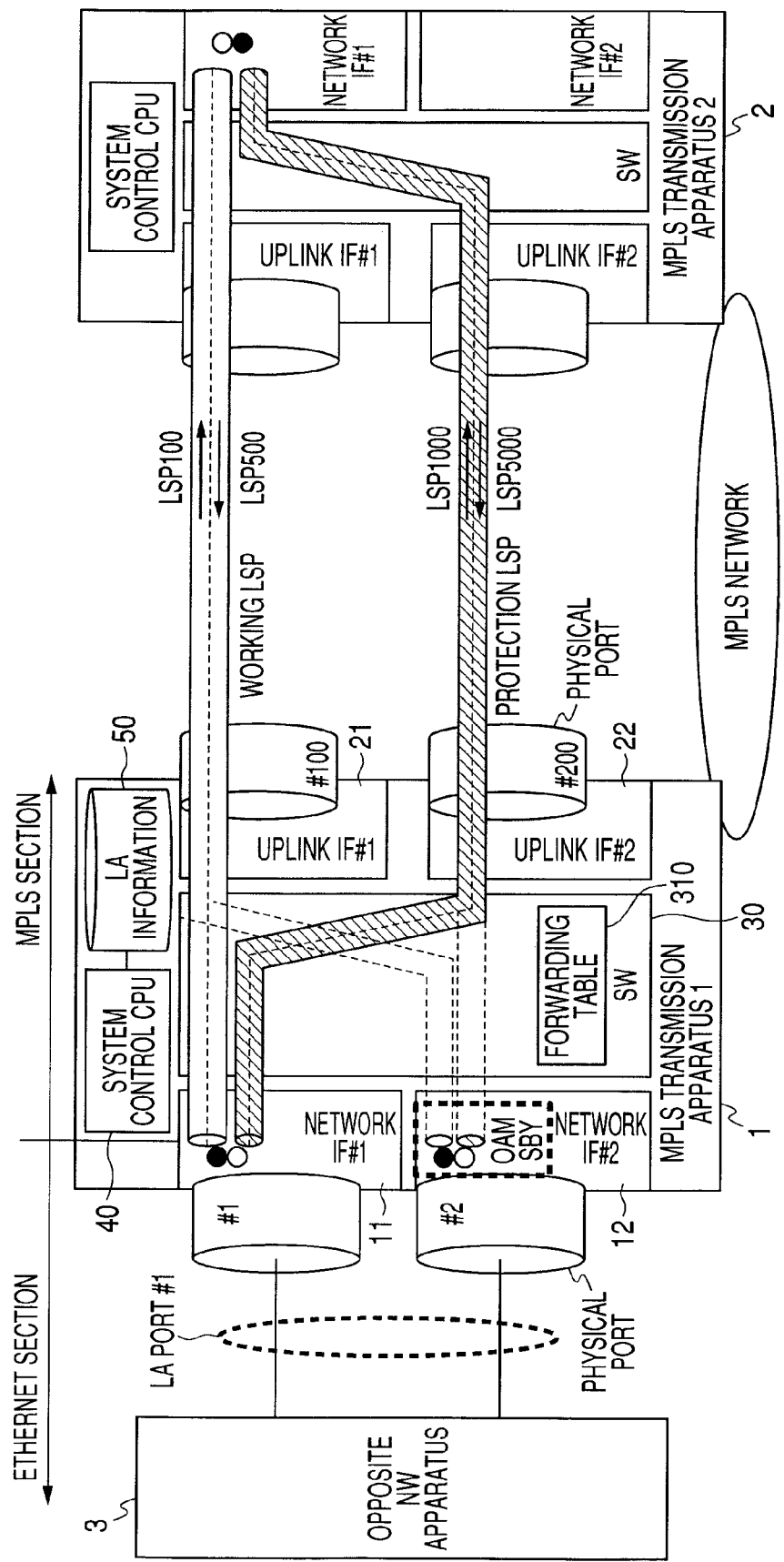
FIG. 15 is a schematic diagram of a system in a first embodiment.

FIG. 15 is a schematic diagram of the system in this embodiment. FIG. 16 shows a configuration example of the forwarding table 310 and LA information database.

The MPLS transmission apparatus 1 is provided with for example network IF#1, 2 (11, 12), Uplink IF#1, 2 (21, 22), switch 30, system control CPU 40 and LA information database 50. The system control CPU 40 is connected with each unit by, for example, a bus or the like. It may also have a memory if required. The switch 30 has a forwarding table 310. The forwarding table 310, for example as shown in FIG. 3B, stores output port information corresponding to the LSP ID.

The opposite NW apparatus (first transmission apparatus) bundles plural physical ports as one logical port, and, in the case of the link aggregation port for which the output destination of a received frame is this logical port, this frame is forwarded to one physical port of the link aggregation ports.

The MPLS transmission apparatus 1 is connected with a MPLS transmission apparatus 2 (second transmission apparatus) via a MPLS network (communication network) which uses a redundant configuration by the working LSP (first path) and protection LSP (second path). The MPLS transmission apparatus 1 encapsulates a frame inputted from the opposite NW apparatus 3 with a label, and forwards it to the MPLS transmission apparatus 2, the label is removed from a frame inputted from the MPLS transmission apparatus 2 to decapsulate it, and it is forwarded to the opposite NW apparatus 3.

The Uplink IF#1 (21) is an interface unit for connecting with the working LSP. The Uplink IF#2 (22) is an interface unit for connecting with the protection LSP. The network IF#1 (11) is an interface unit for connecting with the first physical port that forms the link aggregation port of the opposite NW apparatus 3. The network IF#2 (12) is an interface unit for connecting with the second physical port that forms the link aggregation port of the opposite NW apparatus 3.

The switch 30 has a forwarding table 310 in which an identifier of an interface unit was stored as output destination information corresponding to the LSP label of working and the LSP label of protection. The switch 30 forwards a frame according to corresponding output destination information by looking up the forwarding table 310 based on the label of the frame to which the label was assigned.

The network IF#1 (11) has an OAM ACT/SBY change-over register (first storage part) which shows a fault detection ACT or SBY system, and the first storage unit is set to the ACT system. The network IF#2 (12) has an OAM ACT/SBY change-over register (second storage part) which shows a fault detection ACT or SBY system, and the second storage unit is set to the SBY system.

The network IF#1 (11) receives the user frame transmitted from the first physical port of the opposite NW apparatus 3, encapsulates this user frame with the label of the working LPS, and forwards this user frame to the MPLS transmission apparatus 2 via the working LSP by the switch 30. The network IF#2 (12) receives the user frame transmitted from the second physical port of the opposite NW apparatus 3, encapsulates this user frame with the label of the working LSP, and forwards this user frame to the MPLS transmission apparatus 2 via the working LSP by the switch 30.

The network IF#1 (11) transmits a connectivity verification frame to the MPLS transmission apparatus 2 according to the first storage unit set to the ACT system. On the other hand, the network IF#2 (12) does not transmit a connectivity verification frame to the MPLS transmission apparatus 2 according to the second storage unit set to the SBY system.

The forwarding table 310 stores at least the identifier of the network IF#1 (11) set to ACT as output destination information corresponding to the downstream label received by the network IF#1 (11), network IF#2 (12) via the working and protection LSPs. The switch 30 forwards the connectivity verification frame received from the MPLS transmission apparatus 2 via the working LSP and protection LSP, to the network IF#1 (11) according to the forwarding table 310.

The network IF#1 (11) receives the connectivity verification frame transmitted at a predetermined interval by the MPLS transmission apparatus 2, and a fault in the first or second system LSP is detected when this connectivity verification frame is not received according to the first storage unit set to ACT. On the other hand, the network IF#2 (12) does not perform fault detection when the connectivity verification frame is not received according to the second storage unit set to SBY.

The MPLS transmission apparatus 1 also has a LA information database. A configuration example of a LA information database is shown in FIG. 16B. The LA information database holds information as to which physical port has a LA setting. The LA information database, for example, holds LA setting information which shows whether or not there is a LA setting according to the number of the physical port, and if there is a LA setting, the LA port number (link aggregation identification information), OAM ACT/SBY setting information, and fault information showing whether or not there is a link fault in Ethernet (registered trademark, hereafter idem). Apart from the port number, a suitable identification number may also be used. In this example, the LA setting information is set to "1" in the physical port in which LA is set. The OAM ACT/SBY setting information for example is set to ACT when it is "1", and SBY when it is "0". The fault information for example shows a fault for "1", and no-fault for "0".

Let the physical port which is ACT for this database information be a physical port of the output destination of the forwarding table. For example, the downstream output port of the forwarding table 310 corresponds to the physical port set to ACT of the LA information database. Here, since the ACT/SBY setting information corresponding to the physical port 1 is "1", i.e., ACT, physical port 1 is stored as the output port information corresponding to the downstream label (500, 5000) of the forwarding table 310.

FIG. 17 is a schematic diagram of the network IF 10.

The network IF 10 has a frame receiving circuit 101, label ID search block 102, scheduler 112, label assignment block 103, switch transmitting circuit 104, switch receiving circuit 105, MPLS label processing unit 106, frame transmitting circuit 107, OAM termination unit 108, OAM insertion unit 109, IF control CPU 110, CPU interface unit 111, and OAM ACT/SBY change-over register 200.

In the OAM ACT/SBY change-over register 200, the self-network IF is set to ACT or SBY. For example, it can set for each physical port. Each network IF unit can be provided with an OAM ACT/SBY change-over register 200. Information showing the network IF and ACT/SBY can also be matched and stored outside the second IF.

In order to forward the upstream frame inputted from plural physical ports corresponding to the LA port by the same MPLS LSP, the same values as the set values of the Ingress label search ID table 150, in-use LSP table 160, MPLS label table 170, Egress label search ID table 180 and MPLS label table 190 are preset between network IF which perform LA. These settings can be performed for example by the system control CPU 40. By making these settings, even if the network IF is different, it is possible to forward the frame received from a LA port by the same MPLS LSP.

When the downstream frames do not contain a connectivity verification frame due to an error in the properties of the switch 30, OAM insertion and termination processing (conduction verification processing) are performed with the network IF (e.g., IF#1 (11)) set in the downstream output port by the switch 30, as OAM ACT. On the other hand, OAM insertion and termination processing are not performed by setting the network IF (for example, network IF#2 (12)) which is not set in the downstream output port by the switch 30, to OAM SBY. In order to perform such processing, the network IF also has an OAM ACT/SBY flag in the LA information database. It may have such a flag for each circuit.

Further, it may have plural network IF set to SBY, and priority link aggregation between the plural IF may also be performed. For example, it also has a network IF#3 (5th interface unit) set to SBY. In this case, although not shown, there is also a variation wherein, when the SBY priority of the interface unit is set and a fault occurs in the physical port of ACT, the SBY with higher priority is used as ACT. The priority may be pre-stored corresponding to the physical port in a suitable database or memory such as for example the LA information database.

The network IF set to OAM SBY does not perform OAM insertion processing or OAM termination processing. Therefore, even when an OAM conduction frame is not received, a fault is not erroneously detected. Due to this setting, LA and MPLS OAM can be provided simultaneously.

(Fault Occurrence, ACT/SBY Change-Over in Ethernet Section)

Figure 18:
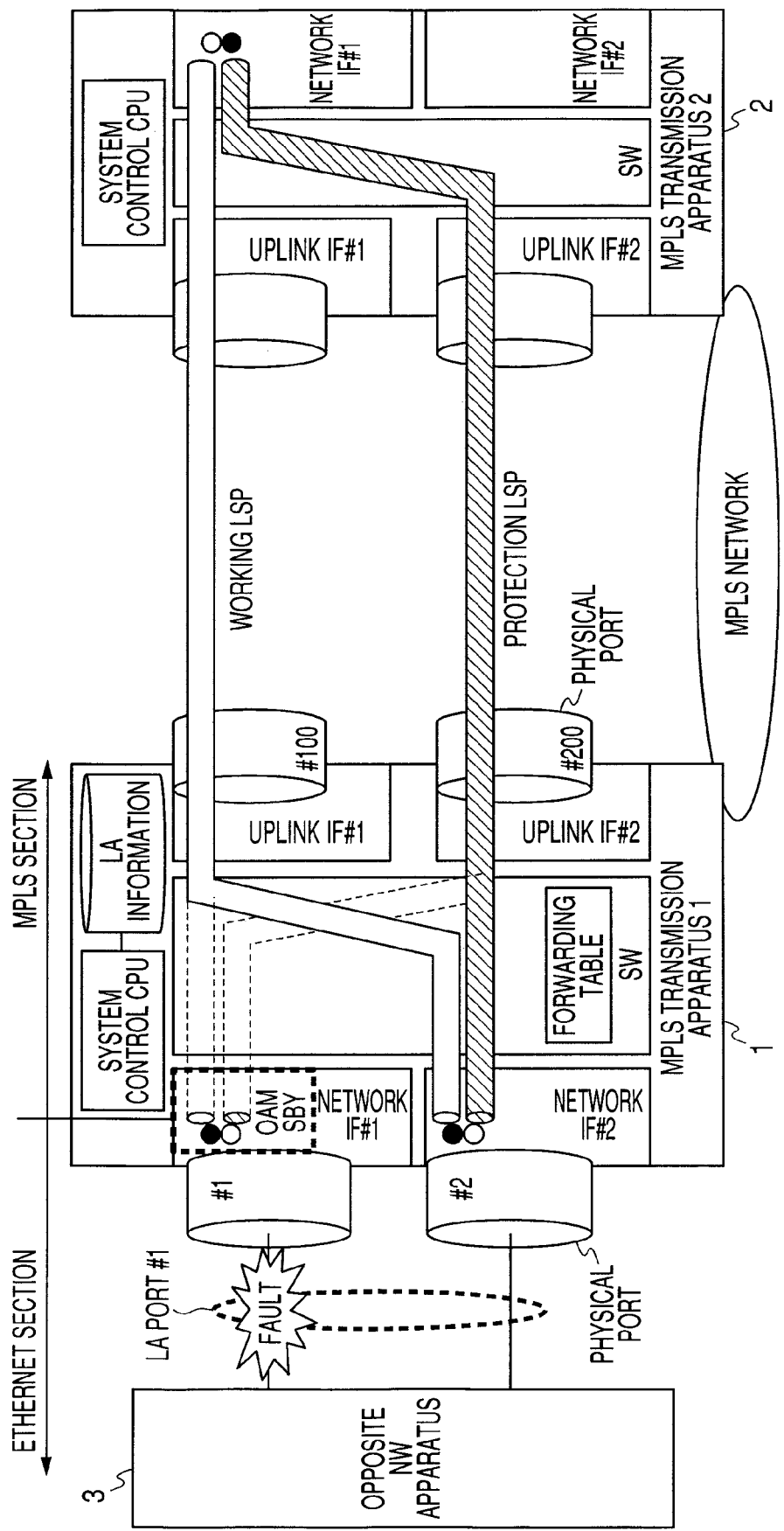
FIG. 18 is a descriptive diagram of ACT/SBY change-over when a fault has occurred in an Ethernet section.

FIG. 18 is a diagram of an ACT/SBY change-over operation when a fault occurs in the Ethernet section. For example, the case will be described where a fault has occurred in a port with a LA setting or link corresponding to this port.

When an obstacle occurs in the physical port (in this example, physical port 1) with a LA setting and which is OAM ACT, the setting of the ACT/SBY flag in the LA database is such that the port where a fault occurred is set to SBY, and the port where a fault did not occur is set to ACT. The OAM ACT/SBY change-over register 200 of each network IF is also changed over, the port where the fault occurred being set to SBY and the port where the fault did not occur being set to ACT.

The setting of the forwarding table 310 of the switch 30 is updated to the physical port where a fault did not occur. Due to this, operation can be continued without the effect of a fault in the Ethernet section extending to the forwarding connection in the MPLS section.

Figure 20:
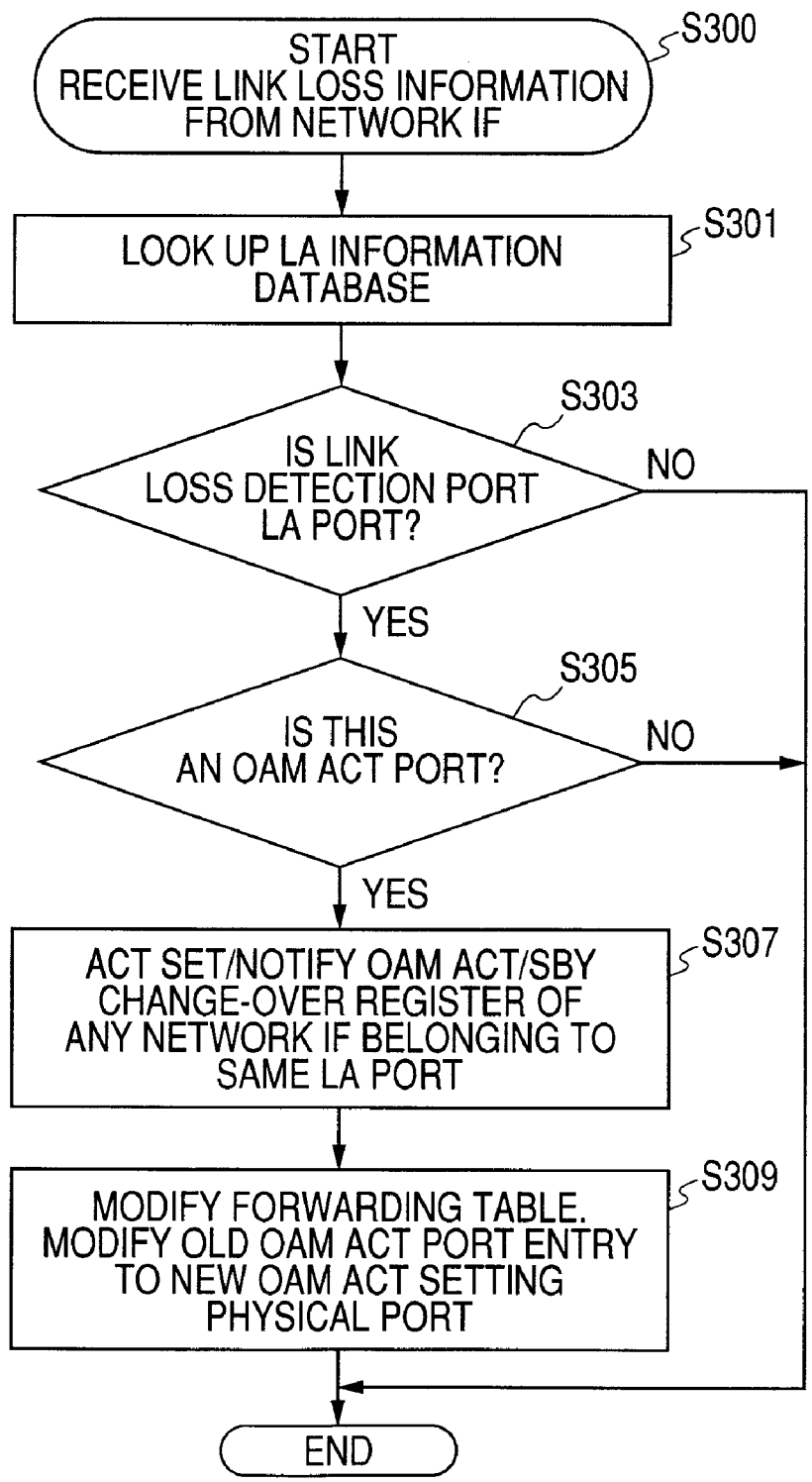
FIG. 20 is a flowchart (1) of a change-over due to fault occurrence in an Ethernet section.

FIG. 19 shows an example of the table configuration after change-over when a fault has occurred in the Ethernet section. FIG. 20 and FIG. 21 are flowcharts of the change-over due to the occurrence of a fault in the Ethernet section. Hereafter, an example of the change-over processing when a fault occurs in the Ethernet section will be described in detail. In the description, it will be assumed that the forwarding table 310 and LA information database prior to the fault, are set for example as in FIG. 16.

FIG. 21A is a process flowchart of the IF control CPU 110 which detected a fault in the network IF.

If a fault occurs in the link of an Ethernet frame, the IF control CPU 110 of the network IF will detect a link loss from a physical port (S400). In this example, the IF control CPU 110 of the network IF#1 (11) detects the occurrence of a fault and performs the following processing.

The IF control CPU 110 sets the OAM ACT/SBY register of the self-network IF to SBY (S401). The IF control CPU 110 notifies a network IF link loss to the system control CPU 40 (S403). This notification may include the physical port number (in this example, physical port 1) corresponding to the self-network IF.

FIG. 20 is a process flowchart of the system control CPU 40 when a network IF fault is detected. When notification of a link loss is received from the network IF (S300), the system control CPU 40 performs the following processing. First, the system control CPU 40 looks up the LA information database (S301). For example, the entry of the physical port number corresponding to the network IF which received the link loss is searched. In this example, this corresponds to the entry for physical port 1. Fault information for this entry is also set, for example to 1.

The system control CPU 40 determines whether this is a link loss detection physical port or a LA port (S303). For example, LA port information on the entry searched in the Step S301 is looked up. If it is "1", it is determined that the port is a LA port, and if it is "0", it is determined that it is not a LA port. If it is determined that it is not a LA port (S303, No), processing is terminated.

On the other hand, if it is determined that the port is a LA port (S303, Yes), the system control CPU 40 determines whether it is a link loss detection physical port or an OAM ACT port (S305). For example, ACT/SBY information on the entry searched in the Step S301 is looked up. If it is "1", it is determined that the port is an OAM ACT port, and if it is "0", it is determined that it is not an OAM ACT port (i.e., it is a OAM SBY port). If it is determined that it is not an OAM ACT port (S305, No), processing is terminated.

On the other hand, if it is determined that the port is an OAM ACT port (S305, Yes), the system control CPU 40 makes a change-over notification to set the OAM ACT/SBY change-over register 200 of any network IF belonging to the same LA port, to ACT (S307). More specifically, the system control CPU 40 searches entries having the same LA port information as the LA port information of the entry searched in the Step S301 from a LA information database. In this example, this corresponds to the entry of physical port 2 of LA port 1. The system control CPU 40 also instructs the IF control CPU 110 of the network IF corresponding to the physical port of this entry, to set the OAM ACT/SBY change-over register 200 to ACT. The system control CPU 40 sets the ACT/SBY setting information for the corresponding entry in the LA information database to "1", i.e., ACT. The system control CPU 40 also sets the ACT/SBY setting information for the entry searched in the step S301, to "0", i.e., SBY.

Next, the system control CPU 40 modifies the forwarding table 310 (S309). For example, the output port of an old OAM ACT port entry is modified to a physical port newly set to OAM ACT. More specifically, the output port information corresponding to the downstream label (e.g., 500, 5000) of the forwarding table 310 shown in FIG. 19(*a*) is updated to the physical port information set to ACT in the LA database. Here, since physical port 2 was set to ACT (FIG. 19B), it is updated to physical port 2.

FIG. 21B is a process flowchart of the IF control CPU 110 which received the modification notice for the OAM ACT/SBY change-over register 200 from the system control CPU 40. The IF control CPU 110 of the network IF (in this example, network IF#2 (12)), when it receives a register modification notice from the system control CPU 40, sets OAM ACT/SBY of its network IF to ACT (S451).

Due to the above processing, the network IF#2 (12) becomes ACT, and communication in the downstream direction can be continued as in the upstream direction. OAM insertion and termination processing are also performed by the network IF#2 (12) set to ACT, and the OAM function can also be continued. Also in the opposite NW apparatus 3, link loss may be detected, and frames can be stopped from being output to the link corresponding to physical port 1 of the MPLS transmission apparatus 1.

(Fault Occurrence and In-Use/SBY Change-Over in MPLS Section—2)

Figure 22:
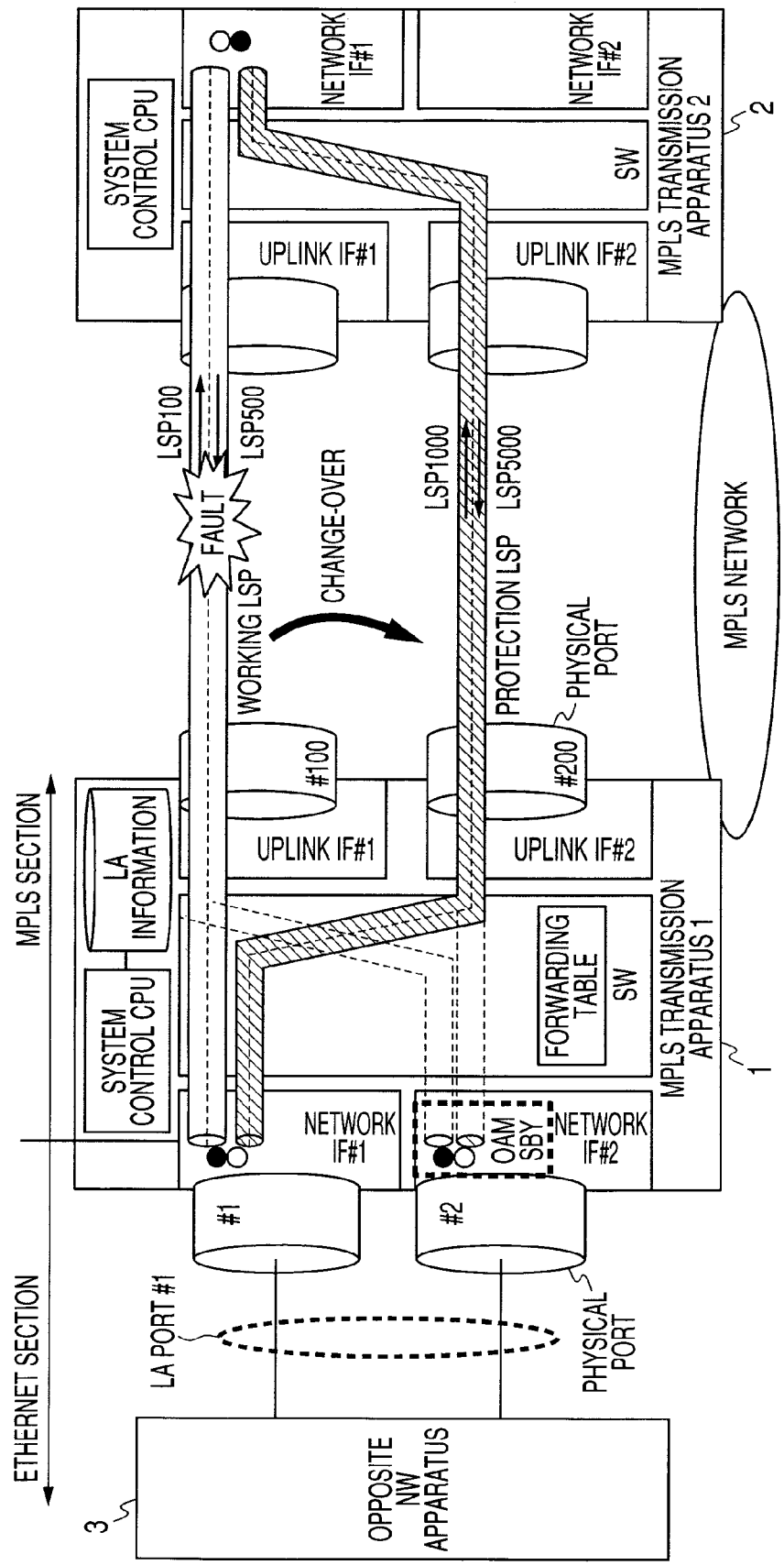
FIG. 22 is a descriptive diagram of in-use/SBY change over when a fault has occurred in an MPLS section.

FIG. 22 is a descriptive diagram of fault occurrence and in-use/SBY change-over in an MPLS section. The network IF#1 (11) and network IF#2 (12) manage the path (here, working) of the operating system in the in-use LSP table 160, respectively. For example, network IF#1 (11) set as the ACT system detects a fault in the path of the operating system due to the fact that an OAM frame corresponding to the path of the operating system could not be received in a predetermined time. The network IF#1 (11) changes the operating system information in the in-use LSP table 160 of the self-network IF to the path of the SBY system (here, protection). For example, by the system change-over operation such as the above S101-S109, the operating system path is changed from working to protection. This is notified also to another network IF (e.g., the network IF#2 (12)) via for example the system control CPU 40, and the other network IF which received this notification changes the operating system information in the in-use LSP table 160 of this network IF, to the SBY system path. In this way, operation can be continued without the effect of the fault in the MPLS section extending to the Ethernet section. After the operating system change-over, the frame inputted from physical ports 1 and 2 is also forwarded to the protection LSP.

Figure 23B:
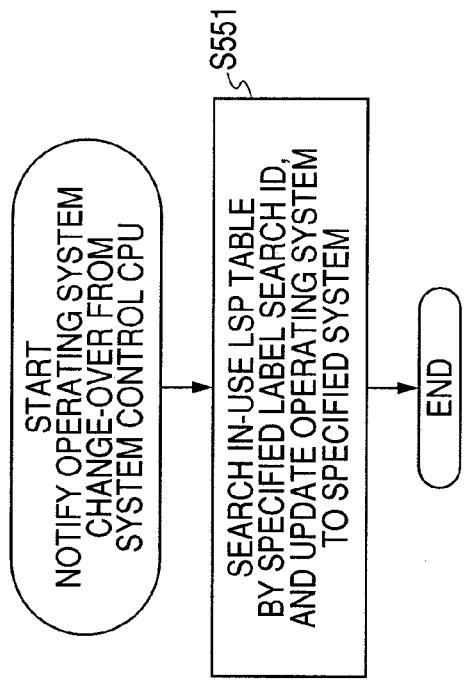
FIG. 23A and FIG. 23B are flowcharts of in-use/SBY change over when a fault has occurred in an MPLS section.
Figure 23A:
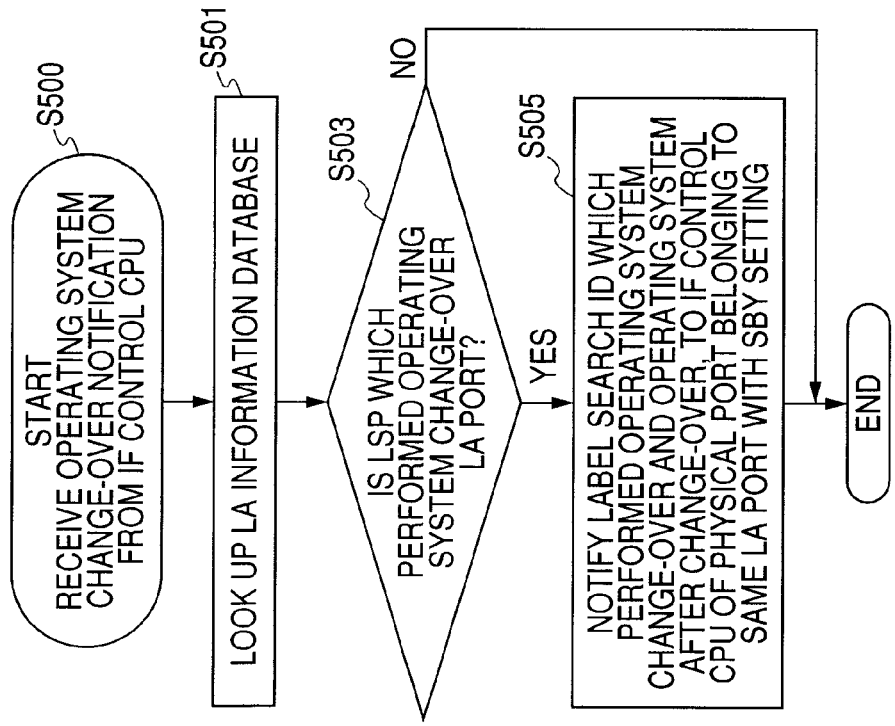

FIG. 23 is a flow chart of in-use/SBY change-over when a fault occurs in the MPLS section. FIG. 23A is a process flowchart of the system control CPU 40 of the MPLS transmission apparatus in which an operating system change-over occurred.

First, the processing of the above-mentioned steps S101-S109 shown in FIG. 12 is performed. Thereby, the in-use LSP table 160 of the network IF (in this example, the network IF#1 (11)) which detected a fault in the MPLS section, is updated to protection, as shown for example in FIG. 10A. The LA information database prior to the occurrence of the fault, will now be described assuming for example the settings shown in FIG. 16(*b*). The in-use LSP table 160 of network IF#2 (12) is set as shown in FIG. 6(*b*).

When notification of an operating system change-over is received (S500) from the IF control CPU 110 of the network IF which detected the fault, the system control CPU 40 performs the following processing. The operating system change-over may include the label search ID, operating system information after the change-over (in this example, protection) and physical port number corresponding to the network IF in which a fault was detected (in this example, physical port 1).

The system control CPU 40 looks up the LA information database (S501). For example, the system control CPU 40 searches the entry of the physical port number contained in the received operating system change-over notification.

The system control CPU 40 determines whether the LSP which performs the operating system change-over, is a LA port (S503). For example, the system control CPU 40 looks up the LA setting information for the search entry. If it is "1", it is determined that the port is a LA port, and if it is "0", it is determined that it is not a LA port. If it is determined that it is not a LA port (S503, No), processing is terminated.

If it is determined on the other hand that it is a LA port (S503, Yes), the system control CPU 40 notifies the label search ID which performed operating system change-over and the operating system after the change-over, to the IF control CPU 110 of the physical port which belongs to the same LA port and is set to SBY (S505). More specifically, the system control CPU 40 searches an entry having the same LA information as the LA port of the entry searched in the step S501 from the LA information database. In the example of the LA information database of FIG. 16(*b*), this corresponds to the entry of physical port 2 for which the LA port information is 1. The system control CPU 40 transmits notification of an operating system change including the label search ID and the operating system information after the change-over to the IF control CPU 110 of network IF (for example, network IF#2 (12)) corresponding to the physical port of the relevant entry. The label search ID and the operating system information after the operating system change-over, may be the same as that contained in the operating system change-over notification received in the step S500.

FIG. 23(b) is a process flowchart of the IF control CPU 110 which received notification of an operating system change-over from the system control CPU 40.

For example, if the IF control CPU 110 of the network IF#2 (12) receives an operating system change-over from the system control CPU 40, it searches the in-use LSP table 160 by the specified label search ID, and updates the operating system to the specified system (S551). Thereby, the in-use LSP table 160 of the network IF#2 (12) is also updated to protection, as shown for example in FIG. 10(a).

When the in-use LSP table 160 is updated from system 0 to protection, in the network IF, when an MPLS label ID is assigned to and inputted frame by looking up the MPLS label table 170, entries for which the operating system is 1 are looked up. For example, when the label search ID is 1 in the case of the table shown in FIG. 6(c), if the operating system is 0, the MPLS label ID is 100, and if the operating system is 1, the MPLS label ID is 1000.

Second Embodiment

Figure 24:
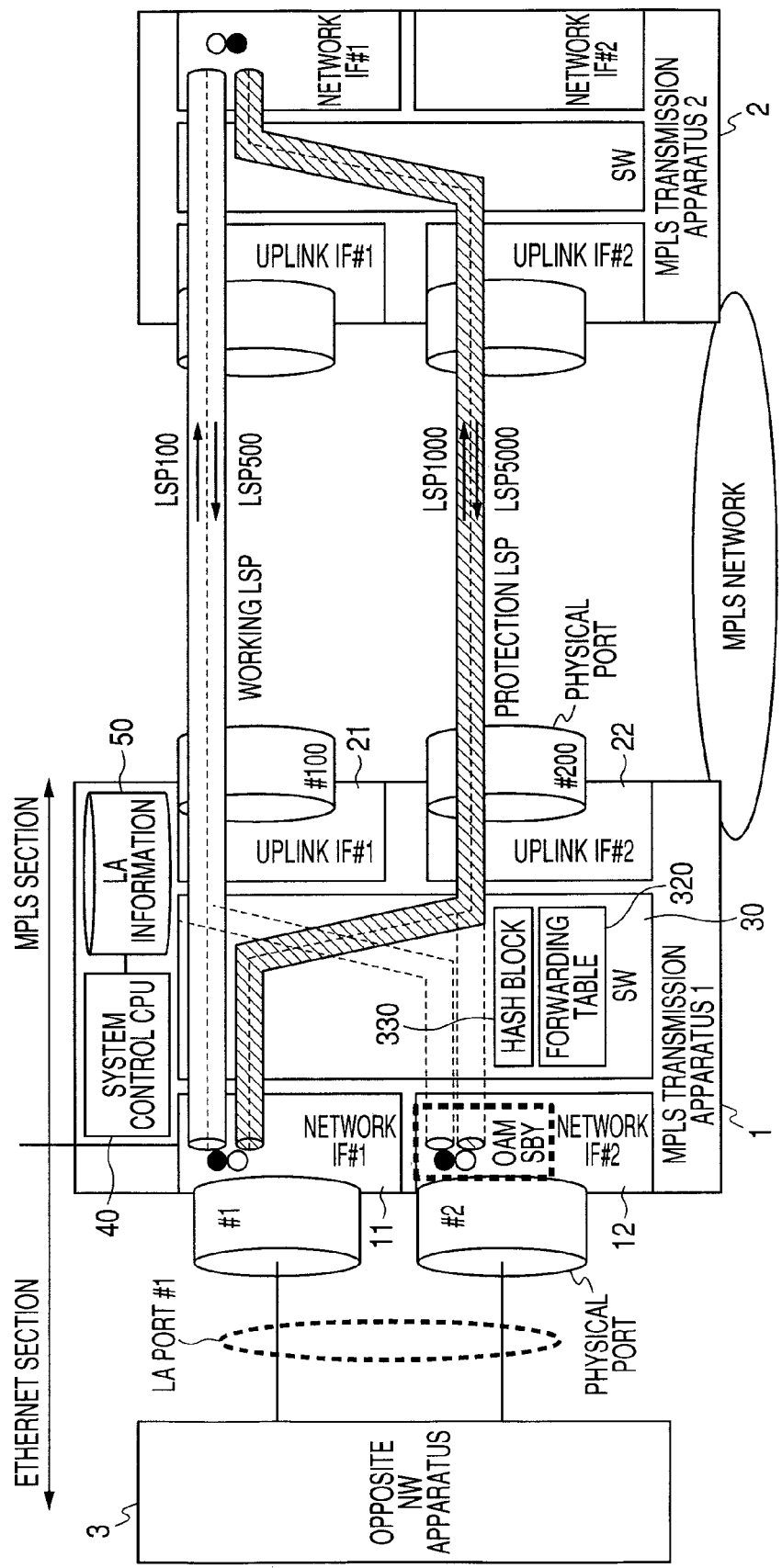
FIG. 24 is a schematic diagram of a system in a second embodiment.

FIG. 24 is a schematic diagram of the system according to a second embodiment.

The ACT/SBY setting of the OAM of this embodiment is the same as that of the first embodiment. In this embodiment, the SW 30 of the MPLS transmission apparatus 1 also has a Hash block 330. A forwarding table 320 holds output port information and OAM ACT port information for a user frame corresponding to a label. The remaining features of the construction are identical to those of the first embodiment.

In the first embodiment, frames going to the LA port (downstream) were forwarded to a specific network IF, but in this embodiment, the user frames are distributed among plural network IF. The OAM frame is forwarded to the network IF set to ACT as in the first embodiment.

FIG. 25 is a schematic diagram of the forwarding table 320 in this embodiment.

The forwarding table 320 stores for example an identifier showing link aggregation as first output destination information for a user frame and an identifier of the network IF#1 (11) set to ACT as second output destination information for a connectivity verification frame, corresponding to the label in the downstream direction received by the Uplink IF#1 and 2 (21, 22) via first and second paths.

The switch 30 identifies whether the frame received from the MPLS transmission apparatus 2 is a user frame or connectivity verification frame. For example, it looks up the OAM label of the frame. If an OAM label is added, or if the OAM label is a value defined beforehand (for example, 14), it identifies it as an OAM frame such as a connectivity verification frame; otherwise, it identifies it as a user frame. In the case of a user frame, the switch 30 selects one interface unit belonging to the link aggregation shown by the first output destination information of the forwarding table 320, based on a predetermined rule. The switch 30 forwards the frame to the opposite NW apparatus 3 via the selected interface unit. In the case of a connectivity verification frame, the switch 30 forwards the frame to the frame network IF#1 (11) according to second output destination information of the forwarding table 320.

For example, in the case of a user frame going to the LA port, in the SW 30 of the MPLS transmission apparatus 1, not only an MPLS label, but an ID which discriminates flows, such as a destination address (DA), VLAN, etc. of MAC, is extracted from the original frame, a Hash calculation is performed by the Hash block 330, and the frame is distributed to a physical port according to the calculation result. The Hash calculation may be performed by a suitable method as in the case of LA. Apart from a Hash calculation, the output destination of a downstream user frame may also be selected from among physical ports belonging to LA by a suitable method. Which physical port belongs to LA, can be stored beforehand. The aforesaid LA information database may also be looked up. In this way, downstream data can be prevented from going to one port, and an OAM function can also be provided.

When a fault occurs in a physical port (for example, a port of the network IF#1 (11)) which has a LA setting and is OAM ACT, as in the case of the aforesaid first embodiment, the port in which the ACT/SBY flag setting showed a fault is set to SBY, and the port in which a fault did not occur is set to ACT. In the first embodiment, the output port information in the forwarding table 320 of SW was updated to the physical port number in which a fault did not occur, but in this embodiment, the OAM ACT port information of the forwarding table 320 is updated to the physical port number of the port in which a fault did not occur. For example, the OAM ACT port information in the forwarding table 320 shown in FIG. 25 is updated to physical port 2.

The invention can be used for example in a system provided with a transmission apparatus having a link aggregation function, and a transmission apparatus having an MPLS function.

What is claimed is:

1. A transmission apparatus connected to a first transmission apparatus wherein a plurality of physical ports are bundled together as one logical port, and when the output destination of a received frame is a link aggregation port which is this logical port, this frame is forwarded to any physical port of the link aggregation port, and connected to a second transmission apparatus via a communications network which removes redundancy via a first path and second path, the purpose of said transmission apparatus being to forward a frame inputted from said first transmission apparatus to said second transmission apparatus by encapsulation with a label, and forwarding the frame inputted from said second transmission apparatus by decapsulation by removing the label, said transmission apparatus comprising:

a first interface unit for connecting to the first path;
a second interface unit for connecting to the second path;
a third interface unit for connecting to the first physical port of said first transmission apparatus forming the link aggregation port;
a fourth interface unit for connecting to the second physical port of said first transmission apparatus forming the link aggregation port; and
a switch having a forwarding table wherein identifiers of said first to fourth interface units are stored as output destination information corresponding to the label of the first path and second path, which forwards the frame according to the corresponding output destination information by looking up said forwarding table based on the label of the frame to which a label was assigned,
wherein said third interface unit has a first storage unit wherein fault detection ACT or SBY is set, and the first storage unit is set to ACT;
wherein said fourth interface unit has a second storage unit wherein fault detection ACT or SBY is set, and the second storage unit is set to SBY;
wherein said third interface unit receives a user frame sent from the first physical port of said first transmission apparatus, and forwards the user frame to the second transmission apparatus by encapsulating the user frame with the label of the first path via the first path by said switch;

wherein said fourth interface unit receives a user frame sent from the second physical port of said first transmission apparatus, and forwards the user frame to the second transmission apparatus by encapsulating the user frame with the label of the first path via the first path by said switch;

wherein said third interface unit sends a connectivity verification frame to said second transmission apparatus according to said first storage unit which was set to ACT;

wherein said fourth interface unit does not send a connectivity verification frame to said second transmission apparatus according to said second storage unit which was set to SBY;

wherein said forwarding table stores at least an identifier of said third interface unit set to ACT as output destination information corresponding to the label in the downstream direction received by said first and second interface units via the first and second paths, and said switch forwards a connectivity verification frame received from said second transmission apparatus by the first path and second path, to said third interface unit according to said forwarding table;

wherein said third interface unit receives the connectivity verification frame sent at a predetermined interval by said second transmission apparatus, and detects a fault in the first or second paths by detecting that the connectivity verification frame was not received according to said first storage unit set to ACT; and wherein said fourth interface unit does not detect a fault by detecting that the connectivity verification frame was not received according to said second storage unit which was set to SBY.

2. The transmission apparatus according to claim 1, further comprising a control unit which controls said third interface unit, said fourth interface unit and said switch, wherein said third interface unit, when a fault in the link which said first transmission apparatus is detected, sets said first storage unit to SBY, and sends a changeover notice to said control unit;

wherein when said control unit receives this changeover notice, it sets the second storage unit of said fourth interface unit to ACT; and wherein, by changing the output destination information corresponding to the label in the downstream direction of the first and second paths to the identifier of said fourth interface unit set to ACT, the connectivity verification frame received from said second transmission apparatus via the first path and second path is forwarded to said fourth interface unit according to said forwarding table.

3. The transmission apparatus according to claim 1, further comprising:

a link aggregation information database in which link aggregation identifier information is stored for identifying a link aggregation port to which the link connected to the interface unit belongs, corresponding to the identifiers of said third and fourth interface units; and a control unit which controls said third interface unit, said fourth interface unit and said switch, wherein, when said third interface unit detects a fault in the link with said first transmission apparatus, it sets said first storage unit to a standby system and sends a changeover notice to said control unit, wherein, when said control unit receives the changeover notice from said third interface unit, it finds link aggregation identifier information corresponding to the identifier of said third interface unit by looking up said link aggregation information database, and acquires an identifier of said fourth interface unit having the same link aggregation identifier information as this link aggregation identifier information, wherein the third interface unit sets said second storage unit of said fourth interface unit for which an identifier was acquired to ACT, and wherein, by changing the output destination information corresponding to the label in the downstream direction of the first and second paths to the identifier of said fourth interface unit set to ACT, the connectivity verification frame received from said second transmission apparatus via the first path and second path is forwarded to said fourth interface unit according to said forwarding table.

4. The transmission apparatus according to claim 1, further comprising:

a fifth interface unit connected to the third physical port which is the link aggregation port of said first transmission apparatus; and a control unit which controls said third to fifth interface units and said switch, wherein said fifth interface unit has a third storage unit set to ACT which performs fault detection or SBY, and said third storage unit set to SBY;

wherein said fourth interface unit and said fifth interface unit have a preset priority for changing to ACT;

wherein, when a fault in the link with said first transmission apparatus is detected, said third interface unit sets said first storage unit to SBY, and sends a changeover notice to said control unit;

wherein, when the control unit receives the changeover notice, said control unit sets said second or third storage unit of said fourth or fifth interface unit to ACT according to the set priority; and wherein, by changing the output destination information corresponding to the label in the downstream direction of the first and second paths to the identifier of said fourth or fifth interface unit according to the set priority, the connectivity verification frame received from said second transmission apparatus via the first path and second path is forwarded to said fourth or fifth interface unit according to said forwarding table.

5. The transmission apparatus according to claim 1, further comprising a control unit which controls said third interface unit, said fourth interface unit and said switch, wherein said third and fourth interface units effectively maintain operating system information displaying the first path as the in-use system of said communications network;

wherein when a fault in the first path is detected due to not receiving the connectivity verification frame sent at a predetermined interval from said second transmission apparatus, or when a system changeover information is received from said second transmission apparatus, said third interface unit changes the operating system information of this interface unit to the second path, and sends a changeover notice to said control unit; and wherein, when the changeover notice is received, said control unit changes the operating system information of said fourth interface unit to the second path; and wherein said third and fourth interface units encapsulate a user frame from said first transmission apparatus by the label of the second path according to the changed operating system information, and forward the encapsulated user frame to said second transmission apparatus.

6. The transmission apparatus according to claim 5, further comprising a link aggregation information database in which link aggregation identifier information is stored for identifying a link aggregation port to which the link connected to the interface unit belongs, corresponding to the identifiers of said third and fourth interface units, wherein when the control unit receives the changeover information from said third interface unit, said control unit finds link aggregation identifier information corresponding to the identifier of said third interface unit by looking up said link aggregation information database, acquires an identifier of said fourth interface unit having the same link aggregation identifier information as this link aggregation identifier information, and changes the operating system information of said fourth interface unit to the second path according to the acquired identifier.

7. The transmission apparatus according to claim 1, wherein said third and fourth interface units comprise:

a first label search table in which predetermined label search identifiers are stored corresponding to virtual network identifiers;

an in-use LSP table in which operating system information showing an operating system path corresponding to the label search identifier is stored, and in which the operating system information is updated by path fault detection; and a label table in which first and second path labels corresponding to system information showing the in-use system or SBY system and a label search identifier are stored, wherein:

when a user frame is received from said first transmission apparatus, said third and fourth interface units extract the virtual network identifier from the user frame;

acquire the corresponding label search identifier by looking up said first label search table based on the extracted virtual network identifier;

specify the operating system information by looking up said in-use LSP table based on acquired label search identifier;

search the system information and label search identifier of said label table based on the operating system information and acquired label search identifier, and extracts the corresponding first or second path label;

encapsulate the received user frame with the acquired label, and forwards the encapsulated user frame to said second transmission apparatus.

8. The transmission apparatus according to claim 7, wherein said first label search table, said in-use LSP table and said label table contain identical contents for said third interface unit and said fourth interface unit.

9. A transmission apparatus connected to a first transmission apparatus wherein a plurality of physical ports are bundled together as one logical port, and when the output destination of a received frame is a link aggregation port which is this logical port, this frame is forwarded to any physical port of the link aggregation port, and connected to a second transmission apparatus via a communications network which removes redundancy via a first path and second path, the purpose of said transmission apparatus being to forward a frame inputted from said first transmission apparatus to said second transmission apparatus by encapsulation with a label, and forward the frame inputted from said second transmission apparatus by decapsulation by removing the label, said transmission apparatus comprising:

a first interface unit for connecting to the first path;

a second interface unit for connecting to the second path;

a third interface unit for connecting to the first physical port of said first transmission apparatus forming the link aggregation port;

a fourth interface unit for connecting to the second physical port of said first transmission apparatus forming the link aggregation port; and a switch having a forwarding table wherein identifiers of said first to fourth interface units are stored as output destination information corresponding to the label of the first path and second path, which forwards the frame according to the corresponding output destination information by looking up said forwarding table based on the label of the frame to which a label was assigned, wherein said third interface unit has a first storage unit in which fault detection ACT or SBY is set, and the first storage unit is set to ACT;

wherein said fourth interface unit has a second storage unit in which fault detection ACT or SBY is set, and the second storage unit is set to SBY;

wherein said third interface unit receives a user frame sent from the first physical port of said first transmission apparatus, and forwards the user frame to the second transmission apparatus by encapsulating the user frame with the label of the first path via the first path by said switch;

wherein said fourth interface unit receives a user frame sent from the second physical port of said first transmission apparatus, and forwards the user frame to the second transmission apparatus by encapsulating the user frame with the label of the first path via the first path by said switch;

wherein said third interface unit sends a connectivity verification frame to said second transmission apparatus according to said first storage unit which was set to ACT;

said fourth interface unit does not send a connectivity verification frame to said second transmission apparatus according to said second storage unit which was set to SBY;

wherein said forwarding table stores at least an identifier showing link aggregation as first output destination information for the user frame corresponding to the label in the downstream direction received by said first and second interface units via the first and second paths, and an identifier of said third interface unit set to ACT as second output destination information for the connectivity verification frame;

wherein said switch identifies whether the frame received by said second transmission apparatus is a user frame or connectivity verification frame; and when the frame is a user frame, the switch selects one of the interface units belonging to the link aggregation showing the first output destination information of said forwarding table based on predetermined rules, and forwards the frame to said first transmission apparatus via the selected interface unit;

when the frame is a connectivity verification frame, the switch forwards the frame to said third interface unit according to the second output destination information of said forwarding table;

wherein said third interface unit receives the connectivity verification frame sent at a predetermined interval by said second transmission apparatus, and detects a fault in the first or second paths if the connectivity verification frame was not received according to said first storage unit set to ACT; and wherein said fourth interface unit does not detect a fault if the connectivity verification frame was not received according to said second storage unit set to SBY.

10. The transmission apparatus according to claim 9, wherein, when the identified frame is a user frame, said switch performs a Hash calculation based on frame address and/or identification information which identifies the flow inputs to said switch, and selects one of the interface units belonging to the link aggregation based on the calculated result.

11. A transmission system including a first transmission apparatus in which a plurality of physical ports are bundled together and used as one logical port, and when the output destination of a received frame is a link aggregation port which is this logical port, this frame is forwarded to any physical port of the link aggregation port;
a second transmission apparatus connected via a communications network which removes redundancy via a first path and second path; and
a third transmission apparatus connected to said first and second transmission apparatuses, said third transmission apparatus forwarding a frame inputted from said first transmission apparatus to said second transmission apparatus by encapsulation with a label, and forwarding the frame inputted from said second transmission apparatus by decapsulation by removing the label,
wherein said third transmission apparatus comprises:
a first interface unit for connecting to the first path;
a second interface unit for connecting to the second path;
a third interface unit for connecting to the first physical port of said first transmission apparatus forming the link aggregation port;
a fourth interface unit for connecting to the second physical port of said first transmission apparatus forming the link aggregation port; and
a switch having a forwarding table wherein identifiers of said first to fourth interface units are stored as output destination information corresponding to the label of the first path and second path, which forwards the frame according to the corresponding output destination information by looking up said forwarding table based on the label of the frame to which a label was assigned,
wherein said third interface unit has a first storage unit in which fault detection ACT or SBY is set, and the first storage unit is set to ACT;
wherein said fourth interface unit has a second storage unit wherein fault detection ACT or SBY is set, and the second storage unit is set to SBY;
wherein said third interface unit receives a user frame sent from the first physical port of said first transmission apparatus, and forwards the user frame to the second transmission apparatus by encapsulating the user frame with the label of the first path via the first path by said switch;
said fourth interface unit receives a user frame sent from the second physical port of said first transmission apparatus, and forwards the user frame to the second transmission apparatus by encapsulating the user frame with the label of the first path via the first path by said switch;
wherein said third interface unit sends a connectivity verification frame to said second transmission apparatus according to said first storage unit which was set to ACT;
said fourth interface unit does not send a connectivity verification frame to said second transmission apparatus according to said second storage unit which was set to SBY;
wherein said forwarding table stores at least an identifier of said third interface unit set to ACT as output destination information corresponding to the label in the downstream direction received by said first and second interface units via the first and second paths, and said switch forwards a connectivity verification frame received from said second transmission apparatus by the first path and second path, to said third interface unit according to said forwarding table;
wherein said third interface unit receives the connectivity verification frame sent at a predetermined interval by said second transmission apparatus, and detects a fault in the first or second paths by detecting that the connectivity verification frame was not received according to said first storage unit set to ACT; and
wherein said fourth interface unit does not detect a fault by detecting that the connectivity verification frame was not received according to said second storage unit which was set to SBY.

12. A transmission system including:
a first transmission apparatus in which a plurality of physical ports are bundled together and used as one logical port, and when the output destination of a received frame is a link aggregation port which is this logical port, this frame is forwarded to any physical port of the link aggregation port;
a second transmission apparatus connected via a communications network which removes redundancy via a first path and second path;
a third transmission apparatus connected to said first and second transmission apparatuses, said third transmission apparatus forwarding a frame inputted from said first transmission apparatus to said second transmission apparatus by encapsulation with a label, and forward the frame inputted from said second transmission apparatus by decapsulation by removing the label,
wherein said third transmission apparatus comprises:
a first interface unit for connecting to the first path;
a second interface unit for connecting to the second path;
a third interface unit for connecting to the first physical port of said first transmission apparatus forming the link aggregation port;
a fourth interface unit for connecting to the second physical port of said first transmission apparatus forming the link aggregation port; and
a switch having a forwarding table wherein identifiers of said first to fourth interface units are stored as output destination information corresponding to the label of the first path and second path, which forwards the frame according to the corresponding output destination information by looking up said forwarding table based on the label of the frame to which a label was assigned,
wherein said third interface unit has a first storage unit in which fault detection ACT or SBY is set, and the first storage unit is set to ACT;
wherein said fourth interface unit has a second storage unit wherein fault detection ACT or SBY is set, and the second storage unit is set to SBY;
wherein said third interface unit receives a user frame sent from the first physical port of said first transmission apparatus, and forwards the user frame to the second transmission apparatus by encapsulating the user frame with the label of the first path via the first path by said switch;
wherein said fourth interface unit receives a user frame sent from the second physical port of said first transmission apparatus, and forwards the user frame to the second transmission apparatus by encapsulating the user frame with the label of the first path via the first path by said switch;

wherein said third interface unit sends a connectivity verification frame to said second transmission apparatus according to said first storage unit which was set to ACT;

wherein said fourth interface unit does not send a connectivity verification frame to said second transmission apparatus according to said second storage unit which was set to SBY;

wherein said forwarding table stores at least an identifier showing link aggregation as first output destination information for the user frame corresponding to the label in the downstream direction received by said first and second interface units via the first and second paths, and an identifier of said third interface unit set to ACT as second output destination information for the connectivity verification frame;

wherein said switch identifies whether the frame received by said second transmission apparatus is a user frame or connectivity verification frame, and wherein, when the frame is a user frame, the switch selects one of the interface units belonging to the link aggregation showing the first output destination information of said forwarding table based on predetermined rules, and forwards the frame to said first transmission apparatus via the selected interface unit, and when the frame is a connectivity verification frame, the switch forwards the frame to said third interface unit according to the second output destination information of said forwarding table;

wherein said third interface unit receives the connectivity verification frame sent at a predetermined interval by said second transmission apparatus, and detects a fault in the first or second paths if the connectivity verification frame was not received according to said first storage unit set to ACT; and wherein said fourth interface unit does not detect a fault if the connectivity verification frame was not received according to said second storage unit set to SBY.

* * * * *